US011365685B2

(12) United States Patent
Leone et al.

(10) Patent No.: US 11,365,685 B2
(45) Date of Patent: *Jun. 21, 2022

(54) METHODS AND SYSTEMS FOR A SERIES GAP IGNITER WITH A PASSIVE PRECHAMBER

(71) Applicant: Ford Global Technologies, LLC, Dearborn, MI (US)

(72) Inventors: Thomas G. Leone, Ypsilanti, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/796,160

(22) Filed: Feb. 20, 2020

(65) Prior Publication Data

US 2021/0262393 A1 Aug. 26, 2021

(51) Int. Cl.
*F02C 7/266* (2006.01)
*H01T 13/46* (2006.01)
*F02D 37/02* (2006.01)
*F02B 23/08* (2006.01)
*F02P 5/15* (2006.01)
(Continued)

(52) U.S. Cl.
CPC ............. *F02C 7/266* (2013.01); *F02B 23/08* (2013.01); *F02D 37/02* (2013.01); *F02P 5/045* (2013.01); *F02P 5/1502* (2013.01); *F02P 15/08* (2013.01); *H01T 13/46* (2013.01); *H01T 13/462* (2013.01); *F02B 19/12* (2013.01); *F02P 3/02* (2013.01)

(58) Field of Classification Search
CPC .. F02B 1/04; F02B 19/10; F02B 19/12; F02B 19/18; F02B 23/08; F02B 2023/085; F02B 37/02; H01T 13/46; H01T 13/462; H01T 13/465; H01T 13/467; F02P 5/045; F02P 15/02; F02P 15/08; F02D 13/0203–0219; F02D 13/0261; F02D 2041/001
See application file for complete search history.

(56) References Cited

U.S. PATENT DOCUMENTS 1,092,322 A * 4/1914 Witter .................. H01T 13/462
313/123
1,233,630 A * 7/1917 White .................. H01T 13/465
313/124

(Continued)

FOREIGN PATENT DOCUMENTS

DE 3305153 A1 * 8/1984 ........... H01T 13/462
FR 512503 A * 1/1921 ........... H01T 13/462

(Continued)

*Primary Examiner* — John M Zaleskas
(74) *Attorney, Agent, or Firm* — Vincent Mastrogiacomo; McCoy Russell LLP

(57) ABSTRACT

Methods and systems are provided for operating an engine with a series gap igniter. In one example, a system may include a series gap igniter coupled to a cylinder head of a cylinder, the series gap igniter including a first spark gap in an internal volume of the series gap igniter and a second spark gap of the series gap igniter external to the internal volume of the series gap igniter and within a clearance volume of the cylinder. In this way, a cylinder with a series gap igniter may be operated to efficiently and reliably initiate combustion over a range of engine operating conditions.

25 Claims, 7 Drawing Sheets

(51) Int. Cl.
  *F02P 15/08* (2006.01)
  *F02P 5/04* (2006.01)
  *F02P 3/02* (2006.01)
  *F02B 19/12* (2006.01)

(56) References Cited

U.S. PATENT DOCUMENTS

| | | | | |
|---|---|---|---|---|
| 1,244,091 A | * | 10/1917 | Jackson | H01T 13/462 313/123 |
| 1,327,057 A | * | 1/1920 | Nilson | H01T 13/462 313/123 |
| 1,342,431 A | * | 6/1920 | Johnd | H01T 13/462 313/123 |
| 1,349,158 A | * | 8/1920 | Kinsel | H01T 13/465 313/123 |
| 1,410,723 A | * | 3/1922 | Rogers | H01T 13/465 313/120 |
| 1,490,713 A | * | 4/1924 | Rupert | H01T 13/465 313/124 |
| 1,556,779 A | * | 10/1925 | Gavlak | H01T 13/46 313/124 |
| 1,561,355 A | * | 11/1925 | Polson | H01T 13/462 313/123 |
| 1,579,916 A | * | 4/1926 | Cushing | H01T 13/462 315/129 |
| 1,754,648 A | * | 4/1930 | Ritchey | H01T 13/462 313/124 |
| 2,226,711 A | * | 12/1940 | Dukelow | H01T 13/462 313/123 |
| 2,473,317 A | * | 6/1949 | Webber | H01T 13/465 313/124 |
| 2,890,365 A | * | 6/1959 | Major | H01T 13/462 313/123 |
| 2,972,077 A | * | 2/1961 | Chapman | H01T 13/462 313/123 |
| 4,176,646 A | * | 12/1979 | Nakamura | F02B 19/12 123/260 |
| 4,616,606 A | * | 10/1986 | Ma | F01L 1/352 123/90.17 |
| 4,924,829 A | * | 5/1990 | Cheng | H01T 13/462 123/259 |
| 5,189,333 A | | 2/1993 | Kagawa et al. | |
| 5,421,300 A | * | 6/1995 | Durling | F02B 19/12 123/266 |
| 5,421,308 A | * | 6/1995 | Hitomi | F02B 29/08 123/559.1 |
| 5,522,357 A | * | 6/1996 | Nogi | F02M 57/06 123/261 |
| 6,089,077 A | * | 7/2000 | Daniels | F02D 35/021 73/35.03 |
| 8,925,518 B1 | | 1/2015 | Riley et al. | |
| 2002/0023604 A1 | * | 2/2002 | Nohara | F01L 1/3442 123/90.15 |
| 2002/0112687 A1 | * | 8/2002 | Labarge | H01T 13/54 123/169 EL |
| 2004/0004425 A1 | * | 1/2004 | Labarge | H01T 13/54 313/140 |
| 2006/0037578 A1 | * | 2/2006 | Nakamura | F01L 13/0005 123/198 F |
| 2006/0267469 A1 | * | 11/2006 | Alger | F02B 19/12 313/118 |
| 2009/0096345 A1 | * | 4/2009 | Posey | H01T 13/462 313/141 |
| 2009/0299610 A1 | * | 12/2009 | Kumano | F02D 13/0203 701/105 |
| 2010/0108031 A1 | * | 5/2010 | Pursifull | F02P 5/1508 123/406.5 |
| 2010/0108032 A1 | * | 5/2010 | Pursifull | B60W 10/08 123/406.12 |
| 2010/0312455 A1 | * | 12/2010 | Yamashita | F02D 41/3035 701/103 |
| 2010/0320894 A1 | * | 12/2010 | Hartmann | H01T 13/22 313/142 |
| 2011/0004392 A1 | * | 1/2011 | Senda | F02P 5/1516 701/102 |
| 2011/0073070 A1 | * | 3/2011 | Ruhland | F01N 13/0093 123/406.19 |
| 2011/0197853 A1 | * | 8/2011 | Takeishi | F02D 13/0261 123/406.45 |
| 2011/0303187 A1 | * | 12/2011 | Sasaki | F02P 5/152 123/406.3 |
| 2012/0029795 A1 | * | 2/2012 | Surnilla | F02D 41/005 701/111 |
| 2014/0000552 A1 | * | 1/2014 | Glugla | F02D 41/1498 123/295 |
| 2015/0046065 A1 | * | 2/2015 | Guido | F02D 41/0027 701/104 |
| 2015/0066265 A1 | * | 3/2015 | Martin | B60W 10/08 701/22 |
| 2015/0083080 A1 | * | 3/2015 | Leone | F02P 5/045 123/406.16 |
| 2018/0066599 A1 | * | 3/2018 | Narahara | F02D 13/0265 |
| 2018/0128157 A1 | * | 5/2018 | VanDerWege | F02B 19/04 |
| 2018/0166862 A1 | * | 6/2018 | Rabhi | F02B 19/12 |
| 2018/0202410 A1 | * | 7/2018 | Ueno | F02D 41/0047 |
| 2018/0320642 A1 | * | 11/2018 | Nakatani | F02P 5/152 |
| 2019/0316535 A1 | * | 10/2019 | Imai | F02D 43/04 |
| 2020/0003173 A1 | * | 1/2020 | Shah | F02P 3/05 |
| 2020/0200068 A1 | * | 6/2020 | Schock | F02B 21/02 |
| 2020/0235552 A1 | * | 7/2020 | Fuchs | H01T 13/462 |
| 2021/0087989 A1 | * | 3/2021 | Ohori | F02D 41/0255 |
| 2021/0222643 A1 | * | 7/2021 | Nagatsu | F02P 13/00 |
| 2021/0246862 A1 | * | 8/2021 | Glugla | F02P 5/145 |
| 2022/0003176 A1 | * | 1/2022 | Leone | H01T 13/462 |

FOREIGN PATENT DOCUMENTS

| | | | | |
|---|---|---|---|---|
| FR | 669133 A | * | 11/1929 | ........... H01T 13/462 |
| FR | 1540265 A | * | 9/1968 | ........... H01T 13/467 |
| GB | 1560812 A | * | 2/1980 | ........... H01T 13/462 |
| JP | 10141194 A | * | 5/1998 | |
| JP | 2000073803 A | * | 3/2000 | |
| JP | 2013083188 A | * | 5/2013 | |
| JP | 2014105651 A | * | 6/2014 | |
| WO | WO-2021160363 A1 | * | 8/2021 | |
| WO | WO-2021160364 A1 | * | 8/2021 | |

* cited by examiner

METHODS AND SYSTEMS FOR A SERIES GAP IGNITER WITH A PASSIVE PRECHAMBER

FIELD

The present description relates generally to methods and systems for engines having passive pre-chamber ignition systems.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a pre-chamber. A passive pre-chamber may be a walled chamber located in the clearance volume of the cylinder and may include a spark plug. During engine operation, an air-fuel mixture is introduced into the cylinder, and a fraction of the air-fuel mixture is inducted into the passive pre-chamber via a pressure differential between the passive pre-chamber and the cylinder during a compression stroke of the cylinder. When ignition is requested, the spark plug in the pre-chamber actuates, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Pre-chamber ignition may offer performance and efficiency benefits over a traditional spark-ignition engine during some engine operating conditions. For example, a cylinder with pre-chamber ignition may operate with more dilution (e.g., higher exhaust gas recirculation or a leaner air-fuel ratio) than a similar cylinder of a traditional spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, passive pre-chamber systems do not offer direct control of fuel and oxygen levels in the pre-chamber. For example, during low load operation, the amount of the air-fuel mixture inducted into the passive pre-chamber may decrease, and low levels of fuel and oxygen in the passive pre-chamber may result in decreased combustion stability and an increased incidence of pre-chamber misfire. In another example, during a cold start condition, a low temperature in the passive pre-chamber may decrease a combustion stability of the pre-chamber.

Other attempts to increase the combustion stability of passive pre-chamber systems across a range of operating conditions include systems for directly injecting both fuel and air into the pre-chamber, referred to herein as an active pre-chamber system. One example approach is shown by Riley et al. in U.S. Pat. No. 8,925,518 B1. Therein, an active pre-chamber system including direct fuel injection and direct oxygen injection in a pre-chamber is disclosed. By including direct fuel injection in the pre-chamber, an AFR of the pre-chamber may be commanded independently of an AFR of the cylinder. Still other attempts to address the combustion stability of passive pre-chamber systems across a range of operating conditions include systems including a second spark plug in a main chamber of a cylinder in addition to a passive pre-chamber in the cylinder, referred to herein as a dual-spark pre-chamber system. By including a passive pre-chamber and the second spark plug in the main chamber of the cylinder, the second spark plug may be used during conditions when the combustion stability of the passive pre-chamber is expected to be relatively low.

However, the inventors herein have recognized potential issues with such systems. As one example, in systems with an active pre-chamber system, the addition of pre-chamber fuel injectors and pre-chamber air injectors may increase a cost and complexity of the system and may introduce significant packaging constraints. As another example, in systems with a dual spark pre-chamber system, the addition of a second spark plug may also increase the cost and complexity and packaging constraints of the system.

In one example, the issues described above may be addressed by a system, comprising: a series gap igniter coupled to a cylinder head of a cylinder, the series gap igniter including a first spark gap in an internal volume of the series gap igniter and a second spark gap of the series gap igniter external to the internal volume of the series gap igniter and within a clearance volume of the cylinder. In this way, the series gap igniter may provide different ignition sources to a cylinder in order to efficiently and reliably initiate combustion over a wide range of operating conditions without adding pre-chamber injectors or separate spark plugs.

As one example, the series gap igniter may further include a first electrode positioned entirely within the internal volume of the series gap igniter and a second electrode coaxial with the first electrode and extending between the internal volume and the clearance volume of the cylinder. For example, the series gap igniter may form a substantially cylindrical tube, and the first electrode may be positioned in the internal volume of the series gap igniter and aligned along a central axis of the series gap igniter. Further, the second electrode may be positioned below the first electrode with respect to gravity and may be aligned along the central axis, with a first, upper end of the second electrode positioned in the internal volume of the series gap igniter and a second, lower end of the second electrode positioned in the clearance volume of the cylinder (e.g., a main combustion chamber of the cylinder), for example. As another example, the first electrode includes a single electrode tip and the second electrode includes a first electrode tip positioned within the internal volume of the series gap igniter and a second electrode tip positioned within the clearance volume of the cylinder. Further, the second electrode tip of the second electrode may not be positioned in the internal volume of the series gap igniter. Further still, the first electrode tip of the first electrode, the second electrode tip of the first electrode, and the single electrode tip of the first electrode may be aligned along the central axis. The first electrode tip of the second electrode and the second electrode tip of the second electrode may be electrically coupled via the second electrode, such that current may flow between the first electrode tip and the second electrode tip, for example.

As an example, the first spark gap may be an air gap separating the single electrode tip of the first electrode from the first electrode tip of the second electrode and may be positioned within the internal volume of the series gap igniter. As another example, the series gap igniter further includes a ground electrode tip coupled directly to a wall of the series gap igniter, the ground electrode tip positioned within the clearance volume of the cylinder, and the second spark gap may be an air gap separating the second electrode tip of the second electrode from the ground electrode tip.

Additionally, the wall of the series gap igniter may separate the internal volume of the series gap igniter from the clearance volume of the cylinder, and a plurality of orifices in the wall may fluidically couple the internal volume of the series gap igniter to the clearance volume of the cylinder. For example, the internal volume of the series gap igniter may function as a passive pre-chamber during some engine operating conditions. As such, during some engine operating conditions, an air-fuel mixture may be inducted into the internal volume of the series gap igniter during a compression stroke of the cylinder, providing an air-fuel mixture to the passive pre-chamber. As another example, the series gap igniter may produce a first spark across the first spark gap and a second spark across the second spark gap when actuated. During some engine operating conditions, the first spark across the first spark gap may ignite the air-fuel mixture in the passive pre-chamber. As such, jets of flame and hot gas may flow into the clearance volume of the cylinder via the plurality of orifices, thus providing an ignition source to the cylinder. During other engine operating conditions, the second spark across the second spark gap may provide an ignition source to the cylinder.

By providing both a pre-chamber spark and an in-cylinder spark via a single series gap igniter, the performance and efficiency increases of pre-chamber ignition may be achieved without including additional pre-chamber injectors or cylinder spark plugs and without experiencing performance degradation during low load and/or low temperature operating conditions. Further, by differently adjusting cylinder settings, including an actuation timing of the series gap igniter, based on whether pre-chamber ignition is desired or cylinder spark ignition is desired, combustion may be reliably produced over a wide range of operating conditions. Overall, engine performance may be increased without increasing a cost and complexity of an ignition system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
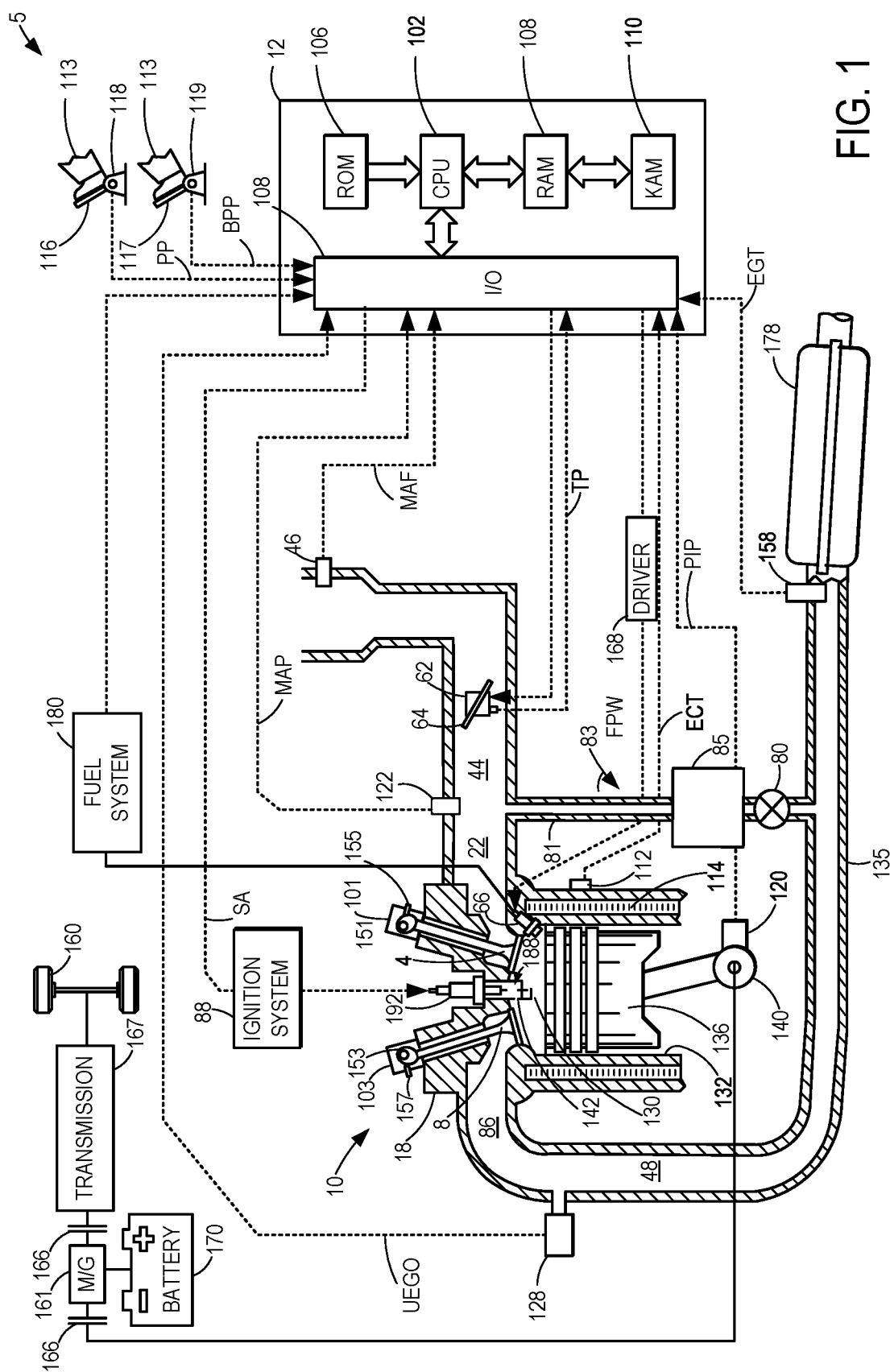
FIG. 1 shows a schematic depiction of a cylinder configuration in an engine system of a vehicle.
Figure 2:
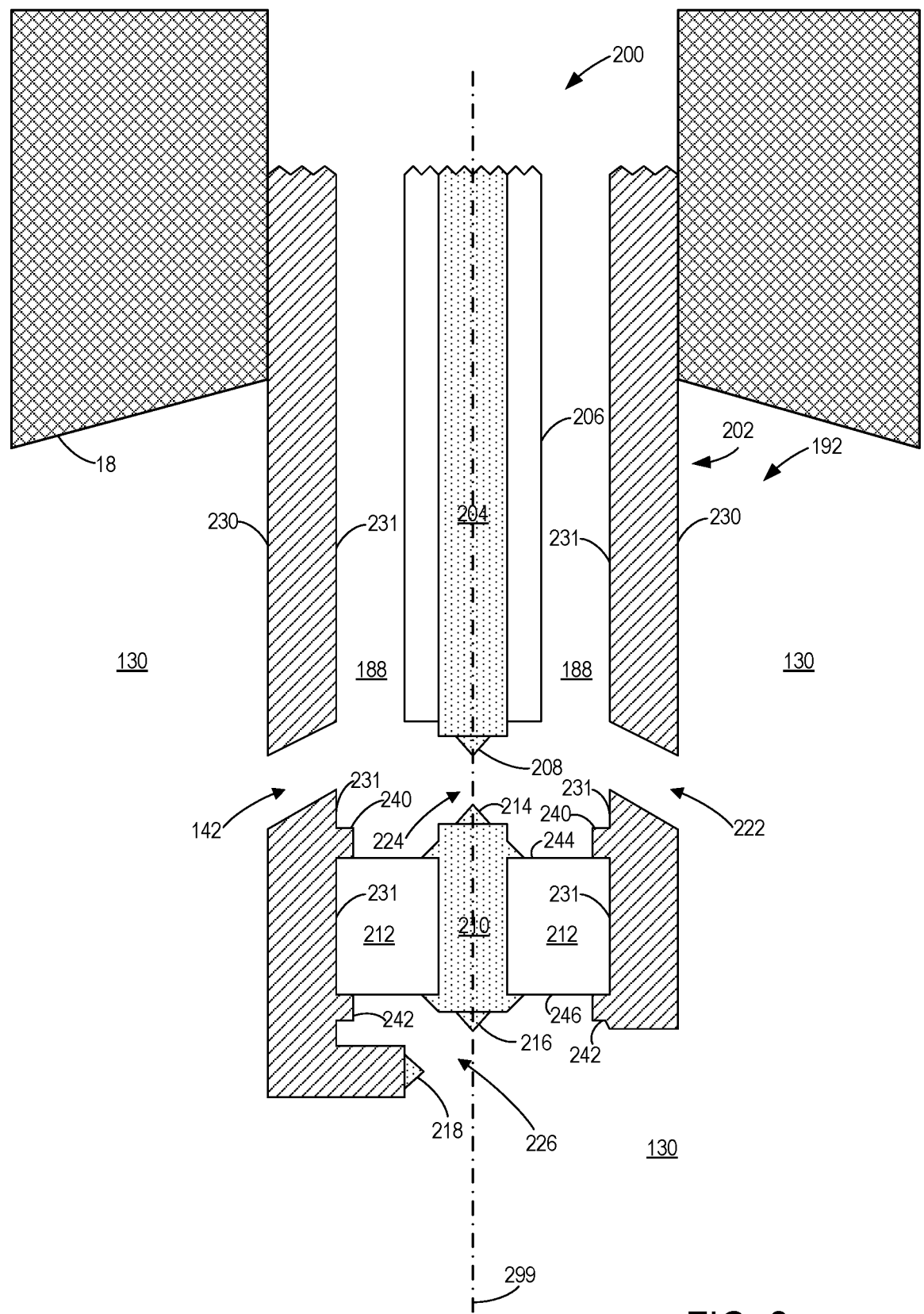
FIG. 2 shows a detailed view of a series gap igniter coupled to the cylinder of FIG. 1.
Figure 5:
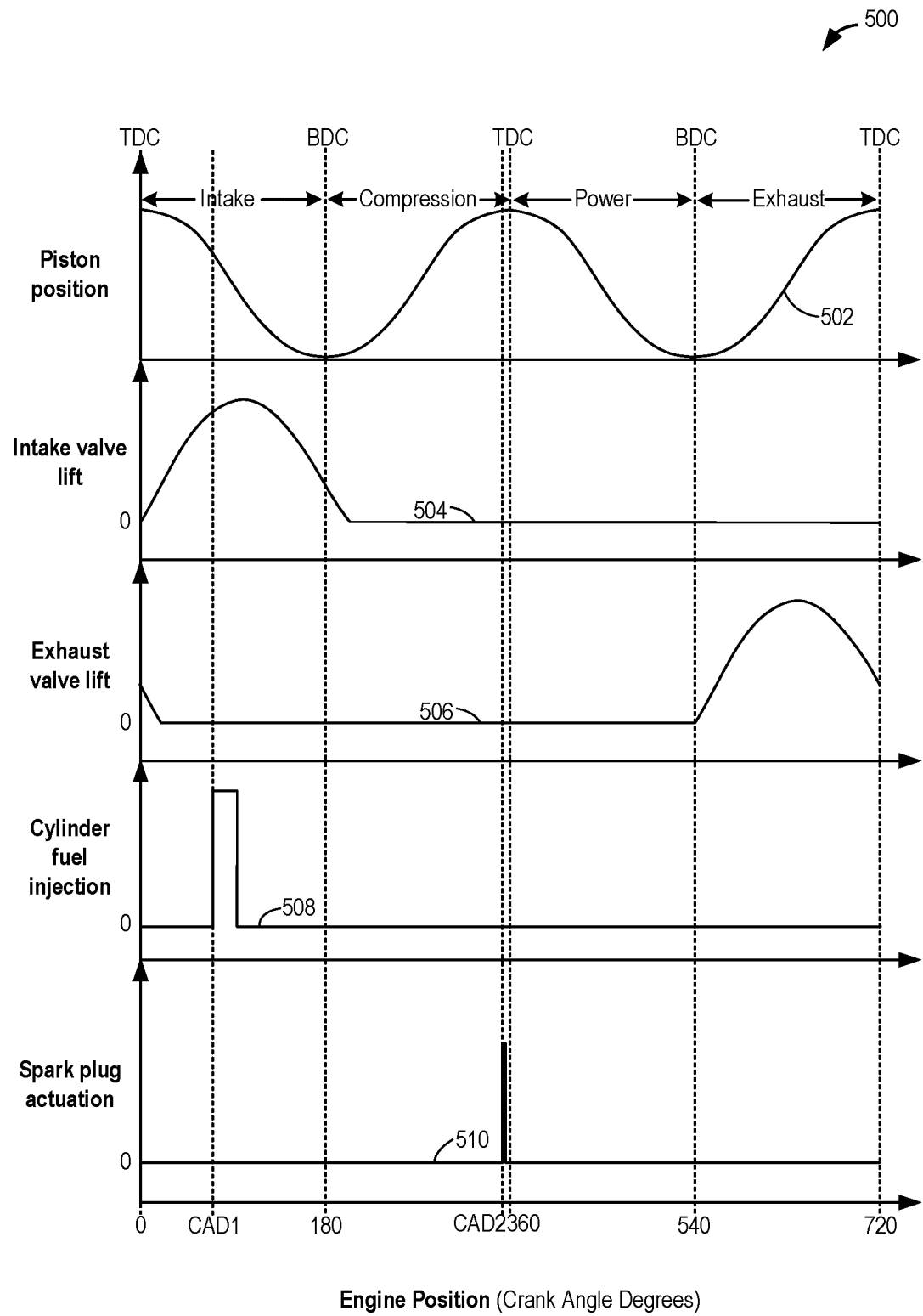
FIG. 5 shows example cylinder valve, spark, and fuel injection timings for operating a cylinder in a first ignition mode.
Figure 6:
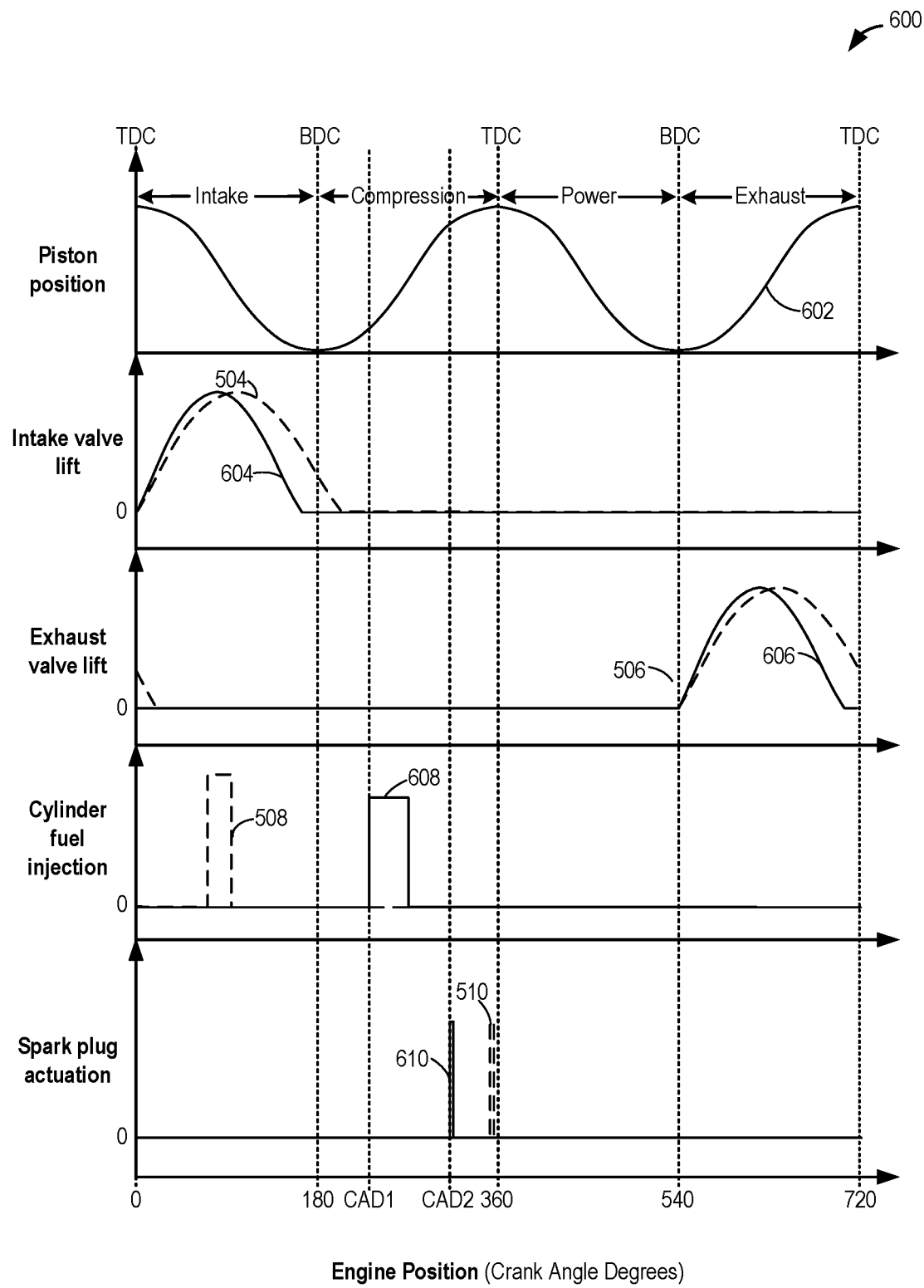
FIG. 6 shows example cylinder valve, spark, and fuel injection timings for operating a cylinder in a second ignition mode.
Figure 7:
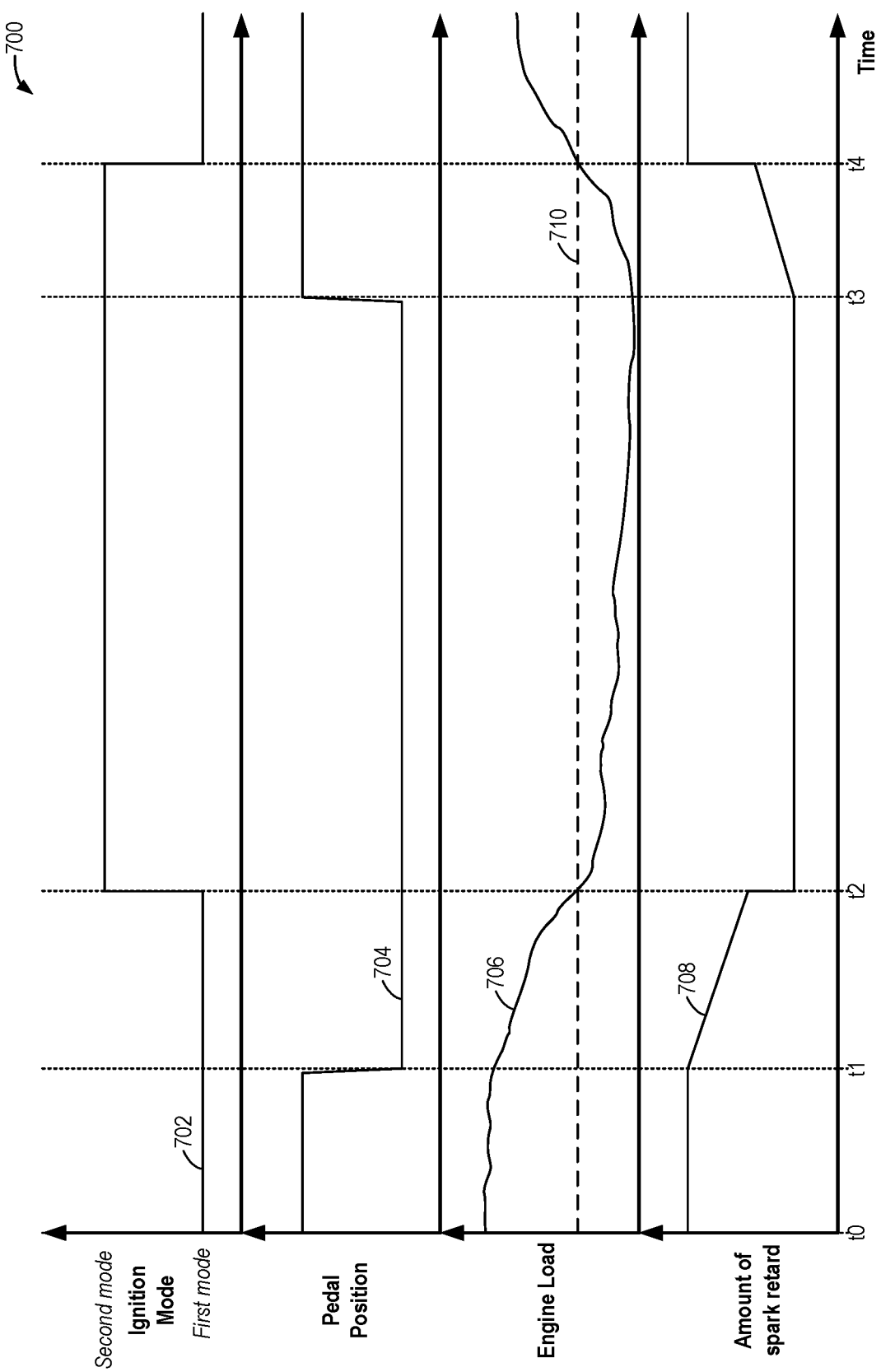
FIG. 7 shows a prophetic example timeline for adjusting engine operation to transition an engine having a series gap igniter and a passive pre-chamber system between ignition modes based on an engine load.

The following description relates to systems and methods for an engine having a passive pre-chamber system and a series gap igniter. The engine may have a plurality of cylinders, each having a cylinder configuration including a series gap igniter, as shown in FIG. 1. The series gap igniter may include two spark gaps in series and may further include a passive pre-chamber, as shown in FIG. 2. The series gap igniter may be electrically coupled to an ignition system according to the wiring diagram shown in FIG. 3. Further, a controller may adjust fueling, air supply, and spark timing in order to transition the cylinder between a first ignition mode and a second ignition mode based on engine operating conditions (e.g., engine load, engine temperature, and cylinder AFR), such as according to the method of FIG. 4. FIG. 5 shows example intake and exhaust valve, spark actuation, and fuel injection timings of a cylinder operating in the first ignition mode, in which pre-chamber combustion provides an ignition source, while FIG. 6 shows example intake and exhaust valve, spark actuation, and fuel injection timings of a cylinder operating in the second ignition mode, in which an ignition spark provides an ignition source. A prophetic example timeline illustrating transitioning between the first ignition mode and the second ignition mode to increase combustion stability and cylinder efficiency is shown in FIG. 7.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of combustion chamber 130, and may be coupled to a cylinder head 18. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO, a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via an accelerator pedal position sensor 118 and a brake pedal position sensor 119), engine speed (as estimated via a crankshaft acceleration sensor), engine temperature (as estimated via an engine coolant temperature sensor), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, cylinder 130 includes a series gap igniter 192 coupled to cylinder head 18 for initiating combustion, shown in more detail in FIG. 2. Series gap igniter 192 includes at least two spark gaps and further includes an internal cavity referred to herein as a passive pre-chamber 188. A first spark gap is positioned in the passive pre-chamber, and a second spark gap is exterior to passive pre-chamber 188. Further, the walls of series gap igniter 192, which enclose passive pre-chamber 188, may include a plurality of openings, such as an opening 142 shown in FIG. 1. Opening 142 provides an orifice between passive pre-chamber 188 and cylinder 130, fluidically coupling the passive pre-chamber to an interior of cylinder 130. The interior of cylinder 130 may be referred to herein as a main chamber. Thus, during some conditions, gases may flow between the interior of series gap igniter 192 (e.g., passive pre-chamber 188) and the interior of cylinder 130 (e.g., the main chamber of cylinder 130). For example, gases (e.g., air, fuel, and/or residual combustion gases) may flow through opening 142 with a directionality and rate based on a pressure difference across opening 142 (e.g., between passive pre-chamber 188 and the interior of cylinder 130). In some conditions, such as while operating in a first ignition mode, opening 142 (along with any other openings in the series gap igniter) may also provide an ignition flame to cylinder 130, as will be elaborated below. In some conditions, such as while operating in a second ignition mode, a second spark gap facing the main chamber of cylinder 130 may provide an ignition spark for combustion in cylinder 130, as will be elaborated below.

Turning briefly to FIG. 2, a detailed partial view 200 of series gap igniter 192 introduced in FIG. 1 is shown, with like components numbered the same as in FIG. 1. View 200 is a cross-sectional view of series gap igniter 192 coupled to cylinder head 18 of cylinder 130. As shown in FIG. 2, series gap igniter 192 includes pre-chamber walls 202, which may form a substantially cylindrical tube with a central axis 299. In particular, pre-chamber walls 202 may include an exterior surface 230 and an interior surface 231. Central axis 299 may be perpendicular to a surface of piston 136 and parallel to cylinder walls 132 of FIG. 1, for example. Further, an exterior surface 230 of the pre-chamber walls 202 may be disposed in main combustion chamber 130, and may be directly or indirectly coupled to an electrical ground. As an example, a ground electrode tip 218 may be coupled to the external surface 230 of the pre-chamber walls 202 and positioned within the main combustion chamber. In the example shown, ground electrode tip 218 is not aligned with central axis 299 (e.g., ground electrode tip 218 is offset from central axis 299).

Series gap igniter 192 further includes an upper electrode 204 encased in insulation 206. Upper electrode 204 may be a cylindrical electrode positioned to be coaxial with axis 299, and insulation 206 may be a hollow cylinder coaxial with 299. An inner radius of insulation 206 may be sized to receive upper electrode 204, and an outer radius of insulation 206 may be smaller than an inner radius of pre-chamber walls 202. Further, an inner radius of insulation 206 may be approximately equal to an outer radius of upper electrode 204 so that an inner surface of insulation 206 is in direct contact with an outer surface of upper electrode 204. Further, a radial gap between pre-chamber walls 202 and insulation 206 may at least partially define a hollow annular cavity forming passive pre-chamber 188. As such, passive pre-chamber 188 includes an internal volume of series gap igniter 192. An upper electrode tip 208 maybe coupled to upper electrode 204 at a distal end of upper electrode (e.g., away from an attachment point at cylinder head 18), and may be positioned in passive pre-chamber 188 along axis 299. Further, upper electrode 204 may be positioned entirely within passive pre-chamber 188.

Series gap igniter 192 further includes a lower electrode 210 encased in insulation 212, the lower electrode 210 coaxial with upper electrode 204. Lower electrode 210 may be a cylindrical electrode positioned to be coaxial with 299, and may be positioned vertically lower relative to upper electrode 204 with respect to the piston and with respect to gravity. Insulation 212 may be a hollow cylinder coaxial with 299, for example, an outer radius of insulation 212 may be sized to be approximately equal to the inner radius of pre-chamber walls 202, such that an outer surface of insulation 212 is in face-sharing contact with the inner surface 231 of pre-chamber walls 202. Insulation 212 may be held in place by an upper lip 240, which may have an inner radius less than the inner radius of pre-chamber walls 202 and extend radially around a top surface 244 of insulation 212. Insulation 212 may be further held in place by a lower lip 241, which may have an inner radius less than the inner radius of pre-chamber walls 202 and extend radially around a bottom surface 246 of insulation 212. Further, the inner radius of insulation 212 may be sized to receive lower electrode 210. Lower electrode 210 includes a first lower electrode tip 214, which may be positioned in passive pre-chamber 188 along central axis 299, and a second lower electrode tip 216, which may be positioned on an exterior surface of series gap igniter 192 along central axis 299. As such, upper electrode tip 208, first lower electrode tip 214, and second lower electrode tip 216 are aligned along the central axis of the series gap igniter. Further, lower electrode 210 extends between the interior of pre-chamber 188 and the exterior of pre-chamber 188. For example, a first end of lower electrode 210 including first lower electrode tip 214 is positioned internal to passive pre-chamber 188, and a second end of lower electrode 210 including second lower electrode tip 216 is positioned external to passive pre-chamber 188.

Thus, a first spark gap 224 is located in passive pre-chamber 188 between upper electrode tip 208 and first lower electrode tip 214. Further, a second spark gap 226 is exterior to passive pre-chamber 188, positioned between second lower electrode tip 216 and ground electrode tip 218. Further, the pre-chamber walls 202 may include a plurality of openings, including opening 142 and an opening 222. The outer surface 230 of pre-chamber walls 202 may be surrounded by and in contact with gases in main combustion chamber 130, while the interior surface 231 of pre-chamber walls 202 may be surrounded by and in contact with gases in the passive pre-chamber 188. The plurality of openings may fluidically couple the internal volume of series gap igniter 192 (e.g., pre-chamber 188) to the main chamber 230. Further, in an alternative embodiment, a second ground strap may be incorporated into the series gap igniter so that the electrical circuit is completed between the series spark gaps via a conductive element that is electrically isolated.

Returning now to FIG. 1, an ignition system 88 may provide an ignition spark to series gap igniter 192 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When series gap igniter 192 is actuated, the air-fuel mixture within the passive pre-chamber may combust, the increased pressure of combustion sending jets of flame into cylinder 130 via the plurality of openings in the pre-chamber walls, including opening 142. The plurality of openings may be arranged such that the jets of flame are evenly distributed in cylinder 130. The jets of flame may ignite the air-fuel mixture in cylinder 130, causing combustion. However, during some conditions, such as low load conditions, the air-fuel mixture within the passive pre-chamber may not combust when series gap igniter 192 is actuated, and thus the external spark gap (e.g., second spark gap 226 of FIG. 2) may ignite the air-fuel mixture within the main chamber. After combustion, a mixture of exhaust gases from both passive pre-chamber 188 and cylinder 130 may be exhausted from cylinder 130 to exhaust manifold 48 via opening of exhaust valve 8.

Engine 10 may be controlled at least partially by controller 12 and by input from a vehicle operator 113 via an accelerator pedal 116 and accelerator pedal position sensor 118 and via a brake pedal 117 a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, signal UEGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, series gap igniter 192, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), igniter, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 3:
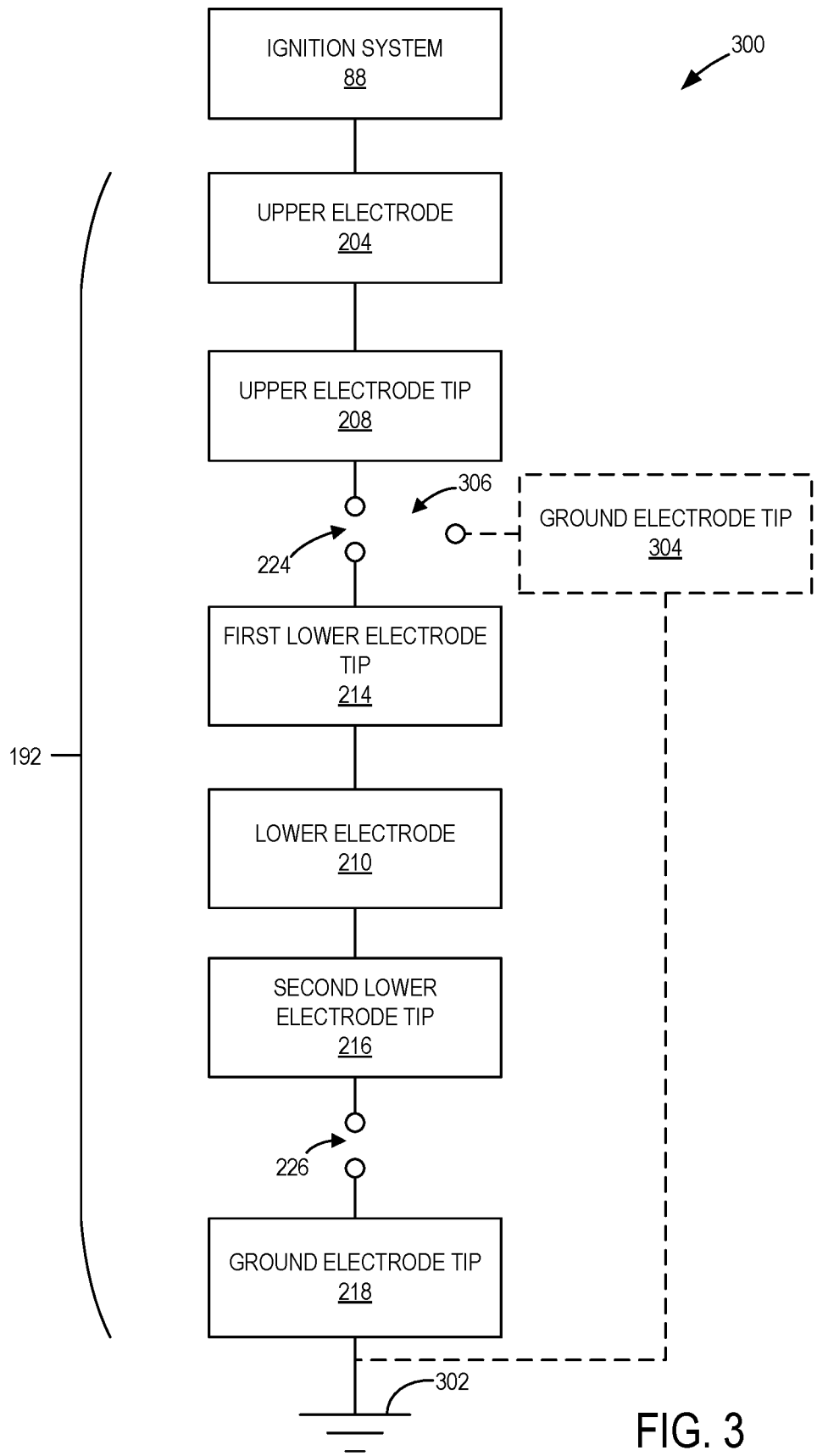
FIG. 3 shows a view of an example wiring diagram for the series gap igniter of FIG. 2.

Next, FIG. 3 shows a wiring diagram for operating a series gap igniter, such as series gap igniter 192 of FIGS. 1-2, in an engine system. FIG. 3 shows a schematic depiction of several components of series gap igniter 192 introduced in FIG. 2, including upper electrode 204, upper electrode tip 208, lower electrode 210, first lower electrode tip 214, second lower electrode tip 216, and ground electrode tip 218. Further, FIG. 3 also includes ignition system 88 of FIG. 1. Series gap igniter 192 is powered by ignition system 88, which may include one or more ignition coils. In particular, ignition system 88 is coupled to upper electrode 204 of series gap igniter 192. Further, upper electrode 204 is directly coupled to upper electrode tip 208, and upper electrode tip 208 is coupled to first lower electrode tip 214 via first spark gap 224. First lower electrode tip 214 is directly coupled to lower electrode 210. Thus, upper electrode 204 and lower electrode 210 are electrically coupled only when a voltage differential between upper electrode tip 210 and first lower electrode tip 214 is higher than a first threshold voltage differential sufficient to cross first spark gap 224.

As shown in FIG. 2, first spark gap 224 may be positioned in passive pre-chamber 188 of cylinder 130. As an example, when the space between upper electrode tip 210 and first lower electrode tip 214 (e.g., first spark gap 224) is occupied by a pre-chamber air-fuel mixture, the first threshold voltage differential may be a breakdown voltage of the pre-chamber air-fuel mixture. A breakdown voltage of a material may be defined as the applied voltage at while the material becomes electrically conductive and acts as a conduit for current. Breakdown voltage may vary as a function of pressure, a distance between terminals, and physical properties of the material. Thus, the breakdown voltage of the pre-chamber air-fuel mixture may be the voltage at which the pre-chamber air-fuel mixture becomes electrically conductive and acts as a conduit for electrical current flowing between the upper electrode tip 210 and the first lower electrode tip 214. When the voltage differential between upper electrode tip 210 and first lower electrode tip 214 exceeds the first threshold voltage differential (e.g., when the voltage differential between upper electrode tip 210 and first lower electrode tip 214 exceeds the breakdown voltage of the air-fuel mixture in first spark gap 224), a current may flow across the first spark gap 224, generating a first spark. Thus, in some examples, when passive pre-chamber 188 contains an air-fuel mixture while a voltage differential greater than the first threshold voltage differential is applied to first spark gap 224, the first spark across first spark gap 224 may ignite the pre-chamber air-fuel mixture.

Further, lower electrode 210 is directly coupled to second lower electrode tip 216, and second lower electrode tip 216 is coupled to ground electrode tip 218 via second spark gap 226. Ground electrode tip 218 is directly coupled to an electrical ground 302. For example, ground electrode tip 218 may be coupled to pre-chamber walls 202 of FIG. 2, which may be grounded. Thus, lower electrode 210 is electrically coupled to electrical ground only when the voltage differential between second lower electrode tip 216 and ground electrode tip 218 is higher than a second threshold voltage differential sufficient to cross second spark gap 226. As shown in FIG. 2, second spark gap 226 may be positioned in the main combustion chamber of cylinder 130. As an example, when the space between second lower electrode tip 216 and ground electrode tip 218 (e.g., second spark gap 226) is occupied by an air-fuel mixture, the second threshold voltage differential may be a breakdown voltage of the air-fuel mixture in the main combustion chamber. In particular, when the voltage differential between second lower electrode tip 216 and ground electrode tip 218 exceeds the second threshold voltage differential (e.g., when the voltage differential between second lower electrode tip 216 and ground electrode tip 218 exceeds the breakdown voltage of the air-fuel mixture in second spark gap 226), a current may flow across the second spark gap 226, generating a second spark. As an example, when the main combustion chamber contains an air-fuel mixture, applying a voltage differential greater than the second threshold voltage differential across second spark gap 226 may generate a spark and ignite the air-fuel mixture in the main combustion chamber.

In this way, series gap igniter 192 is coupled to ignition system 88 via a direct connection between ignition system 88 and upper electrode 204, while series gap igniter 192 is connected to ground via a direct connection between ground electrode 218 and electrical ground 302. When ground electrode 218 is connected to electrical ground 302 and ignition system 88 provides a current to upper electrode 204 (e.g., when the series gap igniter is actuated), the voltage differential between upper electrode 204 and lower electrode 210 may exceed the first threshold voltage differential (e.g., the breakdown voltage of an air-fuel mixture in first spark gap 224), and thus current may flow across the first spark gap 224 from upper electrode 204 to lower electrode 210, generating a first spark in the pre-chamber. Further, current flowing from upper electrode 204 to lower electrode 210 may increase a voltage differential between lower electrode 210 and ground electrode 218, until the voltage differential between lower electrode 210 and ground electrode 218 exceeds the second threshold voltage differential (e.g., the breakdown voltage of an air-fuel mixture in second spark gap 226), causing current to flow across the second spark gap 226 from lower electrode 210 to ground electrode 218, which may generate a second spark in the main chamber of the cylinder.

In the embodiment shown in FIG. 3, the first spark gap 224 and the second spark gap 226 are in series, such that both the first spark gap 224 and the second spark gap 226 generate a spark when the series gap igniter is actuated. However, in some embodiments of the present disclosure, series gap igniter 192 may optionally include a ground electrode tip 304 inside the pre-chamber, ground electrode 304 tip directly coupled to electrical ground 302. Thus, series gap igniter 192 may include a third spark gap 306 located between upper electrode tip 208 and ground electrode tip 304. Further, in this example, each of the first spark gap 224, the second spark gap 226, and the third spark gap 306 may be positioned such that, during high load operation (e.g., when cylinder pressure is high) a spark only occurs across the third spark gap 306 and does not occur across each of the first spark gap 224 and the second spark gap 226. For example, the breakdown voltage of an air-fuel mixture may change based on cylinder pressure. As an example, each of the first spark gap 224, the second spark gap 226, and the third spark gap 306 may be positioned such that, when cylinder pressure exceeds a threshold cylinder pressure, a voltage differential between ignition system 88 and electrical ground 302 is less than the breakdown voltage across each of the first spark gap 224 and the second spark gap 226, and is greater than the breakdown voltage across the third spark gap 306. During such conditions, a spark may occur only across the third spark gap 306 in the pre-chamber of series gap igniter 192 and not across first spark gap 224 or second spark gap 226.

As shown in FIGS. 1-3, a series gap igniter (e.g., a combined pre-chamber and main chamber spark plug) may include at least two spark gaps wired in series, such that actuating an ignition coil coupled to the series gap igniter generates a current across each of the at least two spark gaps.

Further, as shown in FIG. 2, when the series gap igniter is coupled to a cylinder, a first spark gap (e.g., first spark gap 224) may be located in a passive pre-chamber (e.g., passive pre-chamber 188) of the series gap igniter while a second spark gap (e.g., spark gap 226) may be located in a main chamber of the cylinder, external to the passive pre-chamber. In order to provide reliable ignition over a range of engine operating conditions, the engine may transition between a first ignition mode (e.g., a mode calibrated for pre-chamber ignition) and a second ignition mode (e.g., a mode calibrated for main chamber ignition). For example, operating in the first ignition mode may include operating at a leaner air-fuel ratio (AFR), for example. As another example, operating in the second ignition mode may include injecting cylinder fuel during a compression stroke of the cylinder. Thus, to increase combustion stability and engine efficiency over a range of operating conditions, cylinder operation may be adjusted in order to transition between operating in the first ignition mode, in which jets of flame and hot gas from combustion in the passive pre-chamber ignite an air-fuel mixture in the cylinder, and the second ignition mode, in which an ignition spark directly ignites the air-fuel mixture in the cylinder.

Figure 4:
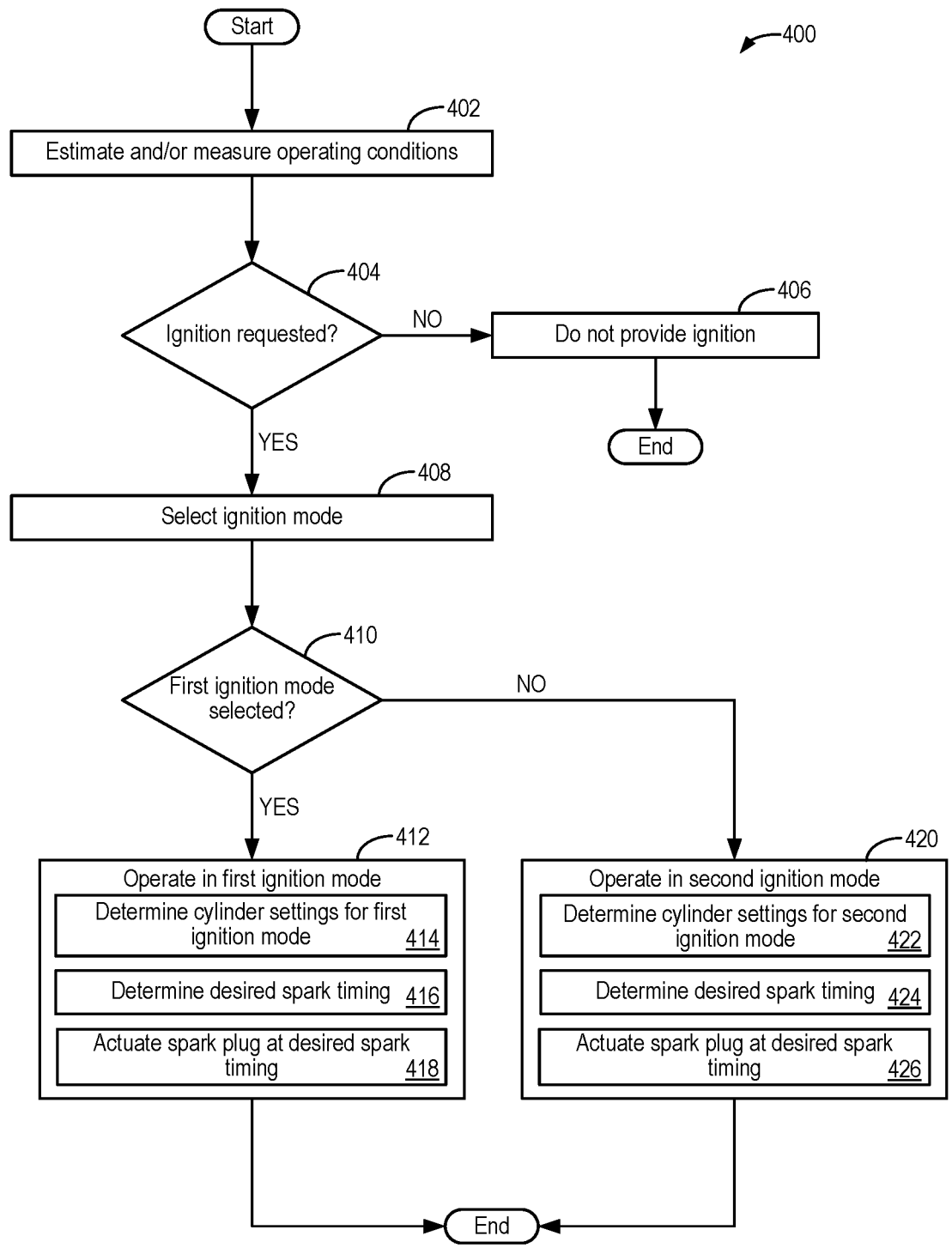
FIG. 4 shows an example method for operating an engine having a series gap igniter and a pre-chamber system in different ignition modes based on operating conditions.

Therefore, FIG. 4 shows an example method 400 for selecting between operating a cylinder with a series gap igniter in a first ignition mode or a second ignition mode based on engine operating conditions, the first ignition mode calibrated for pre-chamber ignition and the second ignition mode calibrated for spark ignition in the cylinder (e.g., main chamber ignition). As illustrated in FIGS. 1 and 2, the series gap igniter may be located in a clearance volume of the cylinder and may include a first spark gap within a passive pre-chamber and a second spark gap in the clearance volume. As such, method 400 will be described with respect to the cylinder configuration shown in FIG. 1 and the series gap igniter configuration shown in FIG. 2, although method 400 may be applied in other systems that include a series gap igniter. Instructions for carrying out method 400 may be executed by a controller, such as controller 12 of FIG. 1, based on instructions stored on a memory of the controller and in conjunction with signals received from sensors of the engine system, such as the sensors described above with reference to FIG. 1 (e.g., mass air flow sensor 46). The controller may employ engine actuators of the engine system to adjust engine operation according to the methods described below. Method 400 will be described with respect to a single cylinder including a pre-chamber, although method 400 may be performed simultaneously for a plurality of cylinders in a multi-cylinder engine.

At 402, method 400 includes estimating and/or measuring operating conditions. The operating conditions may include, for example, vehicle speed, engine speed, engine load, cylinder AFR, exhaust gas AFR, engine temperature, an accelerator pedal position, a brake pedal position, a throttle position, an amount of external EGR, and exhaust gas temperature. The operating conditions may be measured by one or more sensors communicatively coupled to the controller or may be inferred based on available data. For example, the controller may estimate the engine load by inputting a throttle position and a mass air flow (MAF) sensor reading into one or more look-up tables, maps, or functions, which may output engine load. As another example, the exhaust gas temperature may be measured by an exhaust gas temperature sensor, such as exhaust gas temperature sensor 158 of FIG. 1. As yet another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As yet another example, the amount of external EGR may be determined based on a position of an EGR valve, such as EGR valve 80 of FIG. 1.

At 404, method 400 includes determining whether ignition is requested. In some examples, ignition may be requested during nominal engine operation to provide an ignition source for combusting an air-fuel mixture in the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. When ignition is requested, a firing event may occur during the end of the compression stroke. Further, the ignition may be provided by the series gap igniter. In some examples, the ignition source may be an ignition spark in the main chamber of the cylinder, while in other examples, the ignition source may be jets of hot gas and flame from a combustion in the passive pre-chamber of the series gap igniter.

If the controller determines that ignition is not requested at 404, method 400 proceeds to 406 and includes not providing ignition. For example, ignition may not be requested while engine combustion is discontinued. For example, engine combustion may be discontinued while the engine is shut down or during a fuel-cut condition, such as when cylinder fueling is shut off while the vehicle speed decreases. In another example, ignition may not be requested when ignition has already been provided during the combustion cycle. Not providing ignition may include not actuating the series gap igniter. For example, the controller may adjust a control signal to the ignition system of the engine such that the series gap igniter is not activated. Further, because an ignition source is not provided, an air-fuel mixture in the cylinder may not be ignited, and power may not be provided to the engine. After 406, method 400 may end.

If the controller determines that ignition is requested at 404, method 400 proceeds to 408 and includes selecting between the first ignition mode and the second ignition mode. In some examples, the controller may select between the first ignition mode and the second ignition mode based on an engine load. For example, the controller may select the first ignition mode when the engine load exceeds a threshold engine load. The threshold engine load may be a predetermined, non-zero number stored in controller memory that corresponds to a calibrated engine load above which the first ignition mode is indicated due to favorable combustion characteristics of pre-chamber ignition at engine loads above the threshold engine load, for example. In other examples, the controller may adjust the threshold engine load for operating in the first ignition mode by inputting the engine operating conditions (e.g., exhaust gas temperature, engine speed, throttle position, AFR) into one or more look-up tables, maps, or functions, which may output the adjusted threshold engine load for operating in the first ignition mode. In some examples, additional conditions may be used by the controller to select between the first ignition mode and the second ignition mode. For example, if the engine temperature is below a threshold engine temperature for operating in the first ignition mode, the controller may determine to operate in the second ignition mode. The threshold engine temperature may be defined as a temperature below which combustion in the passive pre-chamber is unpredictable. As an example, during a cold start condition, the engine temperature may be below the threshold engine temperature for operating in the first ignition mode, and the controller may determine that operating in the first ignition mode is not indicated (e.g., the second ignition mode is indicated), even if the engine load is greater than the threshold engine load. Conversely, when the engine temperature is above the threshold engine temperature and the engine load is greater than the threshold engine load, the first ignition mode may be selected.

At 410, method 400 includes determining whether the first ignition mode was selected at 408. If the controller determines that the first ignition mode was selected at 408, method 400 proceeds to 412 and includes operating in the first ignition mode. Operating in the first ignition mode includes determining cylinder settings for the first ignition mode, as indicated at 414. For example, the first ignition mode may include cylinder valve and fuel injection settings and/or calibrations that are different than those for the second ignition mode.

Determining the cylinder settings for the first ignition mode may include determining intake and exhaust valve timings, including an intake valve opening timing, closing timing, and open duration, and an exhaust valve opening timing, closing timing, and open duration. For example, the controller may input one or more engine operating conditions, such as throttle position, into one or more look-up tables, maps, or functions that are calibrated for the first ignition mode, which may output the intake valve timings and the exhaust valve timings for operating in the first ignition mode with the given engine operating conditions. In some examples, the controller may adjust a current intake valve setting and a current exhaust valve setting to provide the determined intake valve timings and the determined exhaust valve timings by adjusting a position of one or more camshafts relative to the engine crankshaft. For example, the controller may generate a control signal that adjusts the camshaft position based on the desired valve timings. As another example, the intake valve and the exhaust valve may be electrically actuated, and the controller may actuate the intake valve and the exhaust valves at the determined timings by sending a control signal to one or more electronic actuators controlling the intake valve(s) and the exhaust valve(s). In some examples, the intake and exhaust valve calibrations for operating in the first ignition mode may generally include settings for increasing airflow into the cylinder and expediting an exhaust process (e.g., relative to those for operating the second ignition mode). For example, the intake valve open duration may be increased while operating in the first ignition mode relative to the second ignition mode, which may increase an amount of air inducted into the cylinder. As another example, the exhaust valve opening timing may be advanced while operating in the first ignition mode relative to the second ignition mode, which may begin exhausting combustion gases earlier relative to engine position. As another example, the controller may adjust the intake valve closing time based on engine load while operating in the first ignition mode. In particular, the controller may adjust the intake valve closing time to be closer to BDC in order to increase an effective compression ratio of the cylinder due to faster combustion and increased knock behavior in the cylinder, for example. Further still, the exhaust valve timing may be adjusted to increase an amount of valve overlap between the intake valve and exhaust valve while operating in the first ignition mode in order to increase an amount of internal EGR within the cylinder, for example.

Determining the cylinder settings for the first ignition mode at 414 may further include determining a fuel injection timing. In some examples, the determined fuel injection timing may be adjusted from a current fuel injection timing, such as by advancing or retarding the fuel injection timing from the current fuel injection timing. Retarding the fuel injection timing may include performing the fuel injection later in the combustion cycle (e.g., closer to TDC of the compression stroke), while advancing the fuel injection timing may include performing the fuel injecting earlier in the combustion cycle. For example, the controller may input one or more engine operating conditions, such as throttle position, into one or more look-up tables, maps, or functions that are calibrated for the first ignition mode, which may output a fuel injection timing for operating in the first ignition mode with the given engine operating conditions. In some examples, the controller may adjust the fuel injection timing from the current fuel injection timing by adjusting a timing of an actuation signal sent to the cylinder fuel injector, such as FPW shown in FIG. 1. The actuation signal may actuate the cylinder fuel injector to inject fuel into the cylinder at the determined fuel injection timing. As an example, the fuel injection timing may be advanced to the intake stroke during the first ignition mode, which may increase fuel mixing relative to fuel injection during the compression stroke.

Determining the cylinder settings for the first ignition mode at 414 may still further include determining an amount of fuel to inject into the cylinder. In some examples, the determined amount of fuel may be adjusted from a current fuel injection amount, such as by increasing or decreasing the amount of fuel. The controller may determine the amount of fuel to inject into the cylinder based on a desired AFR of the cylinder and an amount of air inducted into the cylinder. For example, the controller may input a desired cylinder AFR and an estimated amount of air inducted into the cylinder into one or more look-up tables, functions, or maps, which may output a desired fuel amount to inject that will achieve the desired AFR in the cylinder. Further, an injection pressure may be adjusted to increase a burn rate and/or an ignitibility of the air-fuel mixture in the cylinder. For example, the controller may input the and engine operating conditions, such as engine load and the desired AFR, into one or more look-up tables, functions, and maps that are specific to (e.g., calibrated for) the first ignition mode, which may output the amount of fuel to inject for operating in the first ignition mode with the given engine operating condition. In particular, the determined amount of fuel may be predicted to achieve desired combustion qualities in the pre-chamber. In one example, the controller may inject the determined fuel amount by adjusting a pulse-width of the actuation signal sent to the cylinder fuel injector. In some examples, the determined amount of fuel may be injected in a single injection event, while in other examples, the determined amount of fuel may be distributed over a plurality of injection events. The injected fuel may mix with air inducted to the cylinder to form an air-fuel mixture, a portion of which may flow into the passive pre-chamber due to a pressure differential between the pre-chamber and the cylinder. As an example, the desired AFR in the cylinder during the first ignition mode may be lean, and the amount of fuel injected into the cylinder during the first ignition mode may be adjusted (e.g., decreased) in order to achieve the lean desired AFR in the cylinder. Further, the controller may adjust other cylinder settings, such as a position of the EGR valve, while operating in the first ignition mode. For example, while operating in the first ignition mode, the controller may adjust the position of the EGR valve in order to increase a rate of EGR in the cylinder.

Operating in the first ignition mode further includes determining a desired spark timing for the first ignition mode, as indicated at 416. Further, the desired spark timing mode may indicate a desired timing for actuating the series gap igniter (e.g., an actuation timing). Determining the desired spark timing (and thus the actuation timing) may include determining when to ignite the air-fuel mixture in the passive pre-chamber relative to a position of a piston of the cylinder. The desired spark timing may be shifted relative to MBT based on (e.g., as a function of) engine operating conditions in order to achieve a desired pre-chamber ignition timing, and thus, a desired cylinder ignition timing. For example, the desired spark timing may be retarded relative to MBT timing to increase an exhaust gas temperature, while the desired spark timing may be advanced relative to MBT timing to increase a torque output of the cylinder, while an absolute timing of MBT (e.g., with respect to TDC of the compression stroke) varies based on the operating conditions. Further, the desired spark timing (and thus the actuation timing) may be determined as a function of the engine operating conditions using a first actuation timing calibration while operating in the first ignition mode. The first actuation timing calibration may be different than a second actuating timing calibration used while operating in the second ignition mode, as will be elaborated below with respect to 424. For example, the first actuation timing calibration may be calibrated for pre-chamber ignition, whereas the second actuation timing calibration may be calibrated for direct spark ignition in the cylinder. As an example, the relative spark timing (e.g., with respect to MBT timing) may be different while operating in the first ignition mode and the second ignition mode for producing a same fraction of the torque delivered at MBT timing, referred to herein as a torque ratio, due to different ignition and burn rates of pre-chamber ignition (e.g., the first ignition mode) versus direct spark ignition in the cylinder (e.g., the second ignition mode). As one illustrative example, the first actuation timing calibration may include spark timings further retarded from MBT than the second actuation timing calibration for producing a torque ratio of 0.9 (e.g., 90% of the torque delivered at MBT timing).

In one example, the controller may input one or more engine operating conditions (e.g., engine speed, engine load, the amount of external EGR, the exhaust gas temperature, desired pre-chamber AFR, and cylinder AFR) into one or more look-up tables, functions, or maps included in the first actuation timing calibration to determine the desired spark timing for the pre-chamber ignition event. In another example, the controller may make a logical determination (e.g., regarding the desired spark timing) based on logic rules that are a function of the one or more engine operating conditions and the first ignition mode. As an example, the desired spark timing may occur later in the compression stroke (e.g., closer to TDC of the compression stroke) while operating in the first ignition mode than while operating in the second ignition mode.

Operating in the first ignition mode further includes actuating the series gap igniter at the desired spark timing, as indicated at 418. For example, the controller may generate a control signal (e.g., signal SA) that is sent to an ignition system (e.g., ignition system 88 of FIG. 1) to actuate the series gap igniter at the desired spark timing determined at 416. Actuating the series gap igniter at the desired spark timing may generate a first spark across a first spark gap (e.g., a spark gap inside the passive pre-chamber) and a second spark across the second spark gap (e.g., a spark gap outside the passive pre-chamber). Generating the first spark in the passive pre-chamber may cause the air-fuel mixture in the passive pre-chamber to combust, sending jets of hot gas and flame into the cylinder via the pre-chamber orifices. When the cylinder also includes a combustible air-fuel mixture (e.g., when the cylinder is fueled), the jets of hot gas and flame ignite the air-fuel mixture in the cylinder. Because the jets of hot gas and flame ignite the air-fuel mixture in the cylinder more quickly (e.g., with a higher burn rate) than a traditional ignition spark, the second spark (e.g., the ignition spark across the second spark gap in the cylinder) may not provide ignition in the first ignition mode. Method 400 may then end.

If the controller determines that the first ignition mode was not selected at 408, method 400 proceeds to 420 and includes operating in the second ignition mode. Operating in the second ignition mode includes determining cylinder settings for the second ignition mode, as indicated at 422. Determining the cylinder settings for the second ignition mode may include, for example, determining the intake and exhaust valve timings, including the intake valve opening timing, closing timing, and open duration, and the exhaust valve opening timing, closing timing, and open duration, as elaborated above at 414. For example, the controller may input one or more engine operating conditions, such as the throttle position, into one or more look-up tables, maps, or functions that are calibrated for the second ignition mode, which may output the intake valve timings and the exhaust valve timings for operating in the second ignition mode with the given engine operating conditions. In some examples, the intake and exhaust valve calibrations for operating in the second ignition mode may generally include lower airflow settings relative to those for operating the first ignition mode. For example, the intake valve timing may be adjusted while operating in the second ignition mode to decrease the intake valve open duration relative to operating in the first ignition mode, which may decrease an amount of air inducted into the cylinder. As another example, the determined exhaust valve opening timing for operating in the second ignition mode may be retarded relative to the first ignition mode. Further, controller may decrease the amount of valve overlap between the intake valve and the exhaust valve by adjusting the intake valve timing and the exhaust valve timing. As another example, the controller may adjust the intake valve closing time to be further from BDC in order to decrease the effective compression ratio of the cylinder.

Determining the cylinder settings for the second ignition mode at 422 may further include determining the fuel injection timing, such as elaborated above at 414. For example, the controller may one or more engine operating conditions, such as the throttle position, into one or more look-up tables, maps, or functions that are specific to (e.g., calibrated for) the second ignition mode, which may output the fuel injection timing for operating in the second ignition mode and the given engine operating conditions. As an example, the fuel injection timing may be further retarded while operating in the second ignition mode relative to the first ignition mode. For example, fuel injection may occur during the compression stroke during the second ignition mode, which may increase ignitibility in the cylinder relative to fuel injection during the intake stroke (e.g., during the first ignition mode).

Determining the cylinder settings for the second ignition mode at 422 may still further include determining the amount of fuel to inject into the cylinder, such as elaborated above at 414. The controller may determine the amount of fuel to inject into the cylinder by inputting the desired cylinder AFR and the estimated amount of air inducted into the cylinder into one or more look-up tables, functions, or maps that are calibrated for the second ignition mode, which may output the amount of fuel to inject that will achieve the desired AFR in the cylinder for operating in the second ignition mode with the given engine operating conditions. As an example, the desired AFR in the second ignition mode may be stoichiometric, and the amount of fuel injected into the cylinder may be adjusted to achieve the stoichiometric desired AFR. The controller may then actuate the fuel injector at the determined fuel injection timing to inject the determined amount of fuel, as described above at 414.

Operating in the second ignition mode includes determining a desired spark timing for the second ignition mode, as indicated at 424. Determining the desired spark timing may include determining when to generate an ignition spark in the cylinder relative to a position of a piston of the cylinder using the second actuation timing calibration. In one example, the controller may input one or more engine operating conditions (e.g., engine speed, engine load, the exhaust gas temperature, the amount of external EGR, desired pre-chamber AFR, and cylinder AFR) into one or more look-up tables, functions, or maps included in the second actuation timing calibration to determine the desired spark timing for the cylinder ignition event. In another example, the controller may make a logical determination (e.g., regarding the desired spark timing) based on logic rules that are a function of the one or more engine operating conditions and the second ignition mode. Generating the ignition spark in the cylinder may ignite the air-fuel mixture in the cylinder. Thus, the series gap igniter firing may be shifted relative to MBT based on engine operating conditions in order to achieve a desired cylinder ignition timing, as elaborated above with respect to 416. In some examples, the desired spark timing for operating in the second ignition mode may be advanced or retarded relative to the first ignition mode based on engine operating conditions such as engine temperature, engine load, and the amount of external EGR.

Operating in the second ignition mode includes actuating the series gap igniter at the desired spark timing, as indicated at 426. For example, the desired spark timing may be the desired spark timing for the second ignition mode. For example, the controller may generate a control signal (e.g., signal SA) that is sent to the ignition system to actuate the series gap igniter at the desired spark timing determined at 424. Actuating the series gap igniter at the desired spark timing may generate a first spark across the first spark gap (e.g., the spark gap inside the passive pre-chamber) and a second spark across the second spark gap (e.g., the spark gap outside the passive pre-chamber). Due to the engine operating conditions and the cylinder adjustments made at 422 for operating in the second ignition mode, the first spark across the first spark gap in the passive pre-chamber may not cause ignition due to gases in the passive pre-chamber not favoring combustion. For example, an amount of residual gas in the passive pre-chamber may be too high for combustion to occur in the passive pre-chamber (e.g., pre-chamber misfire may occur). In other examples, while operating in the second ignition mode, combustion may occur in the pre-chamber, but the pre-chamber combustion may not influence combustion in the cylinder. Thus, while operating in the second ignition mode, pre-chamber ignition may not occur (even if pre-chamber combustion occurs), and the second spark across the second spark gap may ignite an air-fuel mixture in the cylinder. Method 400 may then end.

In this way, cylinder operating parameters may be adjusted to transition between operating in a first ignition mode and a second ignition mode, the first ignition mode providing pre-chamber ignition and the second ignition mode providing an ignition spark in the cylinder via a single series gap igniter. For example, a controller may select the first ignition mode responsive to higher engine loads and engine temperatures and may adjust the cylinder operating parameters to favor pre-chamber ignition from an internal spark gap of the series gap igniter. As another example, the controller may select the second ignition mode responsive to lower engine loads and engine temperatures and may adjust the cylinder operating parameters to favor spark ignition from an exterior spark gap of the series gap igniter. Although spark may occur at both the internal spark gap and the exterior spark gap during every actuation of the series gap igniter (at least in some examples), by adjusting the cylinder operating parameters based on the selected ignition mode, the controller may more accurately control which spark gap triggers ignition in the cylinder. Further, by transitioning the cylinder between the first ignition mode and the second ignition mode based on the engine load and the engine temperature, a combustion stability and an efficiency of the cylinder may be increased.

Turning now to FIG. 5, an exemplary timing chart 500 of a cylinder operating in the first ignition mode is shown. The cylinder may be cylinder 130 of engine 10 in FIG. 1, for example, and may include a series gap igniter, such as the series gap igniter described in FIGS. 1-3. Timing chart 500 shows one combustion cycle, wherein the combustion cycle (e.g., a cylinder cycle) refers to four strokes of an engine cycle within the cylinder. A piston position relative to top dead center (TDC), bottom dead center (BDC), and the four strokes of the combustion cycle (intake, compression, power, and exhaust) is shown in plot 502. Further, an intake valve lift is shown in plot 504, an exhaust valve lift is shown in plot 506, a cylinder fuel injection signal is shown in plot 508, and a spark actuation signal is shown in plot 510. For all of the above, the horizontal axis represents engine position (e.g., in crank angle degrees), with the crank angle degrees (CAD) increasing from left to right. The vertical axis represents each labeled parameter. For plot 502, the vertical axis shows the piston position relative to TDC. For plots 504 and 506, the vertical axis shows valve lift, with a magnitude of the valve lift increasing up the vertical axis from zero. Zero valve lift corresponds to a fully closed valve, whereas non-zero valve lift corresponds to an open valve. Thus, plots 504 and 506 show a timing, lift, and duration for the corresponding valve. For each of plots 508 and 510, an increase in a magnitude of the parameter above zero indicates actuation of the corresponding injector or series gap igniter. For plot 508, an injection pressure further increases along the vertical axis from bottom to top. Further, the stroke of the combustion cycle is indicated at the top of timing chart 500, the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

At the beginning of the intake stroke (e.g., around 0 CAD), the intake valve opens (plot 504), introducing air into the cylinder via the intake manifold and one or more intake ports, and the piston is at TDC (plot 502). After the intake valve opens, the exhaust valve closes (plot 506) (e.g., around 20 CAD), resulting in positive valve overlap that increases an amount of internal EGR in the cylinder. Between 0 CAD and 180 CAD, the piston position moves to the bottom of the cylinder (plot 502) so as to increase the volume within the cylinder. The position at which the piston is at its bottom-most position in the cylinder and at the end of its stroke (e.g., when the combustion chamber is at its largest volume) is typically referred to as BDC. About halfway through the intake stroke at CAD1 (e.g., around 70 CAD), fuel is introduced into the cylinder (plot 508) via a cylinder fuel injector (e.g., cylinder fuel injector 66 of FIG. 1), forming an air-fuel mixture with the air inducted into the cylinder via the one or more intake ports. By injecting fuel during the intake stroke, an air-fuel mixture in the cylinder may be better mixed, relative to injecting air during the compression stroke. Further, the intake valve is maintained open past the end of the intake stroke (plot 504) in order to increase an effective compression ratio in the cylinder while operating in the first ignition mode.

Next, just after the beginning of the compression stroke, the intake valve closes (plot 504) around 200 CAD. During the compression stroke, the piston moves toward the cylinder head (plot 502) so as to compress the air within the cylinder. The point at which the piston is at the end of its stroke and closest to the cylinder head (e.g., when the combustion chamber is at its smallest volume) is typically referred to as TDC. During the compression stroke, as the piston moves toward TDC, pressure in the cylinder increases, which forces an amount of the air-fuel mixture into a passive pre-chamber of the series gap igniter (e.g., passive pre-chamber 188).

In a process herein referred to as ignition, the air-fuel mixture in the passive pre-chamber of the series gap igniter is ignited via actuating the series gap igniter (plot 510), which may cause a spark across both an upper spark gap (e.g., first spark gap 224 shown in FIG. 2) and a lower spark gap (e.g., second spark gap 226 of FIG. 2). In particular, the ignition spark across the upper spark gap may ignite the air-fuel mixture in the passive pre-chamber of the series gap igniter, resulting in pre-chamber combustion. For example, the series gap igniter may be actuated at CAD2, shortly before TDC of the compression stroke (e.g., around 350 CAD). As the air-fuel mixture in the pre-chamber combusts, jets of flame and hot air flow from the pre-chamber to the cylinder via orifices in walls of the passive pre-chamber (e.g., such as orifice 142 and orifice 222 of FIG. 2), and the jets of flame and hot air ignite the air-fuel mixture in the cylinder. Thus, during the power stroke (e.g., between 360 CAD and 540 CAD), the expanding gases in the cylinder push the piston back down to BDC (plot 502). A crankshaft (e.g., crankshaft 140 shown in FIG. 1) converts this piston movement into a rotational torque of the rotary shaft. Just before the beginning of the exhaust stroke, around 530 CAD, the exhaust valves are opened to release the combusted air-fuel mixtures to the corresponding exhaust passages (plot 506), and the piston position returns to TDC (plot 502).

Turning now to FIG. 6, an exemplary timing chart 600 of a cylinder operating in the second ignition mode is shown. The cylinder may be cylinder 130 of engine 10 in FIG. 1, for example, and may include a series gap igniter, such as the series gap igniter described in FIGS. 1 and 2. As introduced above for timing chart 500 of FIG. 5, timing chart 600 shows one combustion cycle. Thus, timing chart 600 is similar to timing chart 500 of FIG. 5 except for the differences highlighted below. A piston position relative to top dead center (TDC), bottom dead center (BDC), and the four strokes of the combustion cycle (intake, compression, power, and exhaust) is shown in plot 602. Further, an intake valve opening is shown in plot 604, an exhaust valve opening is shown in plot 606, a cylinder fuel injection signal is shown in plot 608, and a spark actuation signal is shown in plot 610. Further, plots for like quantities from FIG. 5 (e.g., while operating in the first ignition mode) are shown as dashed plots for reference. For all of the above, the horizontal axis represents engine position (e.g., in crank angle degrees), with the crank angle degrees (CAD) increasing from left to right. The vertical axis represents each labeled parameters. For plot 602, the vertical axis shows the piston position relative to TDC. For plots 604 and 606, the vertical axis shows valve lift, with a magnitude of the valve lift increasing up the vertical axis from zero. Zero valve lift corresponds to a fully closed valve, whereas non-zero valve lift corresponds to an open valve. Thus, plots 604 and 606 show a timing, lift, and duration for the corresponding valve. For each of plots 608 and 610, an increase in a magnitude of the parameter above zero indicates actuation of the corresponding injector or series gap igniter. For plot 608, an injection pressure further increases along the vertical axis from bottom to top. Further, the stroke of the combustion cycle is indicated at the top of timing chart 600, the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

At the beginning of the intake stroke (e.g., around 0 CAD), the intake valve opens (plot 604), introducing air into the cylinder via the intake manifold and one or more intake ports, and the piston is at TDC (plot 602). Further, at 0 CAD, the exhaust valve is closed (plot 606), reducing an amount of internal EGR in the cylinder. Between 0 and 180 CAD, the piston position moves to the bottom of the cylinder (plot 602) so as to increase the volume within the cylinder. Before the end of the intake stroke (e.g., around 160 CAD), the intake valve closes (plot 604), while the exhaust valve remains closed (plot 606). Thus, the intake valve closing while operating in the second ignition mode (plot 604) is advanced (e.g., occurs sooner within the combustion cycle) relative to intake valve closing in the first ignition mode (dashed plot 504). For example, advancing the intake valve closing while operating in the second ignition mode decreases the effective compression ratio of the cylinder. During the compression stroke (e.g., between 180 CAD and 360 CAD), the piston moves toward the cylinder head (plot 602) so as to compress the air within the cylinder. About halfway through the compression stroke at CAD1 (e.g., around 270 CAD), fuel is introduced into the cylinder (plot 608) via a cylinder fuel injector (e.g., cylinder fuel injector 66 of FIG. 1), forming an air-fuel mixture with the air inducted into the cylinder via the one or more intake ports. Thus, fuel injection while operating in the second ignition mode (plot 608) may be retarded (e.g., occurs later within the combustion cycle) relative to operating in the first ignition mode (dashed plot 508). Compression stroke injection may increase the concentration of fuel near the second spark gap relative to injection during the intake stroke (e.g., in the first ignition mode, as shown in dashed plot 508). Further, as shown by the relative magnitudes of plot 608 and dashed plot 508, fuel injection may occur at a lower pressure during the second ignition mode.

In a process herein referred to as ignition, the air-fuel mixture in the cylinder is ignited via actuating the series gap igniter (plot 610), which may cause a spark across both upper spark gap 224 and lower spark gap 226. In particular, the ignition spark across the lower spark gap may ignite the air-fuel mixture in the main chamber, resulting in cylinder combustion. For example, the series gap igniter may be actuated before TDC of the compression stroke at CAD2 (e.g., around 330 CAD). While operating in the second ignition mode, spark timing may be further from TDC of the compression stroke (plot 610) relative to spark timing while operating in the first ignition mode (dashed plot 510). As a result, during the power stroke (e.g., between 360 CAD and 540 CAD), the expanding combustion gases in the cylinder push the piston back down to BDC (plot 602). A crankshaft (e.g., crankshaft 140 shown in FIG. 1) converts this piston movement into a rotational torque of the rotary shaft. During the exhaust stroke, the exhaust valves are opened (plot 606) to release the combusted air-fuel mixture to the corresponding exhaust passages, and the piston position returns to TDC (plot 602). As shown, exhaust valve opening while operating in the second ignition mode may be retarded (plot 606) relative to exhaust valve opening while operating in the first ignition mode (dashed plot 506).

Turning now to FIG. 7, a prophetic example timeline 700 of an engine transitioning between a first ignition mode and a second ignition mode is shown. The engine may be engine 10 in FIG. 1, including cylinder 130 and series gap igniter 192, for example. Although some parameters are shown for a single cylinder in FIG. 7, it may be understood that the cylinder may be included in a multi-cylinder engine system. An indication of whether the engine is operating in the second ignition mode ("second mode") or the first ignition mode ("first mode") is shown in plot 702, a pedal position (e.g., a determined based on a signal from an accelerator pedal position sensor, such as accelerator pedal position sensor 118 of FIG. 1) is shown in plot 704, an engine load is shown by plot 706, and an amount of spark retard (e.g., from MBT spark timing) is shown by plot 708. Further, a threshold engine load for operating in the first ignition mode is shown by dashed line 710. For all of the above, the horizontal axis represents time, with time increasing along the horizontal axis from left to right. The vertical axis represents each labeled parameter. For each of plots 704, 706, and 708, a magnitude of the parameter increases up the vertical axis. For plot 702, the vertical axis shows whether the engine is operating in the first ignition mode ("first mode") or the second ignition mode ("second mode").

At time t0, the engine operates in the first ignition mode (plot 702) and the pedal position is relatively high (e.g., corresponding to a high driver-demanded torque), as shown in plot 704. Because of the high driver-demanded torque, the engine load is relatively high (plot 706), and the amount of spark retard (plot 708) is relatively high. Between time t0 and time t1, the ignition mode (plot 702) remains constant, the pedal position (plot 704) remains constant, the amount of spark retard (plot 708) remains constant, and the engine load (plot 706) fluctuates slightly without any changes greater than 5%.

Just before time t1, the pedal position (plot 704) decreases due to a decrease in driver-demanded torque. Thus, between time t1 and time t2, the engine load (plot 706) in response to the decrease in the driver-demanded torque. The amount of spark retard (plot 708) also decreases due to a decreased risk of knock at the lower engine load. However, between time t1 and time t2, the engine load (plot 706) remains greater than the threshold engine load for operating in the first ignition mode (dashed line 710), and so the engine continues to operate in the first ignition mode (plot 702).

At time t2, the engine load (plot 706) falls below the threshold engine load for operating in the first ignition mode (dashed line 710), and in response, the engine transitions to operating in the second ignition mode (plot 702). As outlined in method 400 of FIG. 4, transitioning to the second ignition mode may include adjusting a fuel injection timing, a fuel injection amount, a valve timing, and a spark timing. Thus, when the engine load (plot 706) falls below the threshold engine load for operating in the first ignition mode (dashed line 710), the engine transitions from the first ignition mode to the second ignition mode by decreasing the amount of spark retard (plot 708) to a lower value.

Between time t2 and time t3, the pedal position (plot 704) does not change, the engine load (plot 706) remains below the threshold engine load for operating in the first ignition mode (dashed line 710). As a result, the engine continues operating in the second ignition mode (plot 702). Further, the amount of spark retard (plot 708) remains relatively low while operating in the second ignition mode. Because the pedal position (plot 704) remains low, the engine load (plot 706) continues to decrease between time t2 and time t3.

Just before time t3, the pedal position (plot 704) increases, and the engine load (plot 706) begins to increase. Between time t3 and time t4, the pedal position (plot 704) remains constant while the engine load (plot 706) increases. However, the engine load (plot 706) remains below the threshold engine load for operating in the first ignition mode (dashed line 710), and so the engine continues to operate in the second ignition mode (plot 702). Further, the amount of spark retard (plot 708) begins to increase due to the increasing engine load and its effect on knock.

At time t4, the engine load (plot 706) exceeds the threshold engine load for operating in the first ignition mode (dashed line 710). In response, the engine transitions to operating in the first ignition mode (plot 702). After time t4, the pedal position (plot 704) remains constant, and the engine load (plot 706) increases further above the threshold engine load for operating in the first ignition mode (dashed line 710). Therefore, the engine continues operating in the first ignition mode (plot 702) after time t4.

In this way, a cylinder with a series gap igniter may be operated to favor different ignition sources based on engine operating conditions in order to efficiently and reliably initiate combustion. By selecting between operating in a first ignition mode and a second ignition mode based on one or more engine operating conditions, such as engine load, the engine may transition between providing pre-chamber ignition (e.g., igniting an air-fuel mixture in the cylinder with jets of flame and hot gas from combustion in a passive pre-chamber) and spark ignition (e.g., igniting the air-fuel mixture in the cylinder with an ignition spark in the cylinder). Further, by adjusting one or more cylinder settings, such as spark timing, intake/exhaust valve timing, a fuel injection timing, and a fuel injection amount, the engine may transition between operating in the first ignition mode and the second ignition mode without actuating any additional components. For example, the single series gap igniter enables both pre-chamber ignition and direct spark ignition within the cylinder. The first ignition mode may increase a burn rate and an efficiency of the cylinder during engine operating conditions that increase combustion stability in the passive pre-chamber, such as higher engine loads and temperatures, while the second ignition mode ensures that cylinder ignition is reliably provided during conditions in which the combustion stability of the passive pre-chamber is expected to be relatively low. By providing both pre-chamber ignition and conventional spark ignition via a single series gap igniter, a number of components is reduced compared with systems that include active pre-chambers and/or additional spark plugs. Overall, providing a series gap igniter in the cylinder may increase combustion stability across a range of operating conditions without increasing a package size or complexity of the ignition system.

The technical effect of including a series gap igniter in a cylinder having a passive pre-chamber, a first spark gap of the series gap igniter within the pre-chamber and a second spark gap of the series gap igniter external to the pre-chamber and within a main chamber of the cylinder, is that an ignition source changes based on operating conditions, thereby increasing combustion stability and reducing an occurrence of cylinder misfire and undesirable noise, vibration, and handling issues that may otherwise occur.

As one example, a system comprises: a series gap igniter coupled to a cylinder head of a cylinder, the series gap igniter including a first spark gap in an internal volume of the series gap igniter and a second spark gap of the series gap igniter external to the internal volume of the series gap igniter and within a clearance volume of the cylinder. In the preceding example, additionally or optionally, the series gap igniter further includes a first electrode positioned entirely within the internal volume of the series gap igniter and a second electrode extending between the internal volume and the clearance volume of the cylinder. In one or both of the preceding examples, additionally or optionally, the first electrode includes a single electrode tip and the second electrode includes a first electrode tip positioned within the internal volume of the series gap igniter and a second electrode tip positioned within the clearance volume of the cylinder. In any or all of the preceding examples, additionally or optionally, the first spark gap is between the single electrode tip of the first electrode and the first electrode tip of the second electrode. In any or all of the preceding examples, additionally or optionally, the series gap igniter further includes a ground electrode tip coupled directly to a wall of the series gap igniter, the ground electrode tip positioned within the clearance volume of the cylinder, and wherein the second spark gap is between the second electrode tip of the second electrode and the ground electrode tip. In any or all of the preceding examples, additionally or optionally, the wall of the series gap igniter separates the internal volume of the series gap igniter from the clearance volume of the cylinder, and one or more orifice in the wall fluidically couple the internal volume of the series gap igniter to the clearance volume of the cylinder. In any or all of the preceding examples, additionally or optionally, the series gap igniter produces a first spark across the first spark gap and a second spark across the second spark gap when actuated.

As another example, a system comprises: an engine including a plurality of cylinders, each cylinder including a series gap igniter, the series gap igniter including a first spark gap internal to a pre-chamber and a second spark gap external to the pre-chamber. In the preceding example, additionally or optionally, the series gap igniter further includes an upper electrode and a lower electrode, the upper electrode including an upper electrode tip positioned within the pre-chamber, the lower electrode including a first lower electrode tip positioned within the pre-chamber and a second lower electrode tip positioned external to the pre-chamber. In one or both of the preceding examples, additionally or optionally, the first spark gap is positioned between the upper electrode tip and the first lower electrode tip. In any or all of the preceding examples, additionally or optionally, the series gap igniter further includes a ground electrode tip coupled to an outer wall of the series gap igniter, and wherein the second spark gap is positioned between the second lower electrode tip and the ground electrode tip. In any or all of the preceding examples, additionally or optionally, the upper electrode tip, the first lower electrode tip, and the second lower electrode tip are aligned along a central axis of the series gap igniter, and wherein the ground electrode tip is not aligned along the central axis of the series gap igniter.

As another example, a method for an engine comprises: providing a first spark via a first spark gap enclosed in a pre-chamber of a series gap igniter of a cylinder and a second spark via a second spark gap exterior to the pre-chamber by actuating the series gap igniter; and adjusting a timing of actuating the series gap igniter based on engine operating conditions. In the preceding example, additionally or optionally, adjusting the timing of actuating the series gap igniter based on the engine operating conditions includes: responsive to at least one of an engine load exceeding a threshold engine load and an engine temperature exceeding a threshold engine temperature, operating the series gap igniter using a first actuation timing calibration; and responsive to at least one of the engine load falling below the threshold engine load and the engine temperature falling below the threshold engine temperature, operating the series gap igniter using a second actuation timing calibration. In one or both of the preceding examples, the first actuation timing calibration includes different actuation timings relative to maximum brake torque (MBT) timing than the second actuation timing calibration for producing a same torque ratio. In any or all of the preceding examples, additionally or optionally, the method further comprises: inducting air into the cylinder via an intake valve and delivering fuel to the cylinder via a fuel injector to produce an air-fuel mixture in the cylinder; and flowing a first portion of the air-fuel mixture into the pre-chamber via a pressure differential between the pre-chamber and the cylinder, a second portion of the air-fuel mixture remaining in the cylinder. In any or all of the preceding examples, additionally or optionally, operating the series gap igniter using the first actuation timing calibration includes: igniting the first portion of the air-fuel mixture in the pre-chamber via the first spark to produce a pre-chamber combustion event; and igniting the second portion of the air-fuel mixture via the pre-chamber combustion event. In any or all of the preceding examples, operating the series gap igniter using the second actuation timing calibration includes igniting the second portion of the air-fuel mixture in the cylinder via the second spark. In any or all of the preceding examples, additionally or optionally, the method further comprises: operating an intake valve of the cylinder with a greater intake valve open duration while operating the series gap igniter with the first actuation timing calibration than while operating the series gap igniter with the second actuation timing calibration; and operating an exhaust valve of the cylinder with a greater exhaust valve open duration while operating the series gap igniter with the first actuation timing calibration than while operating the series gap igniter with the second actuation timing calibration. In any or all of the preceding examples, additionally or optionally, the method further comprises: delivering fuel to the cylinder at a timing closer to top dead center of a compression stroke of the cylinder while operating the series gap igniter with the second actuation timing calibration than while operating the series gap igniter with the first actuation timing calibration.

As another example, a method comprises: selecting between operating a cylinder with a series gap igniter in a first ignition mode and a second ignition mode based on engine operating conditions, the series gap igniter including a first spark gap positioned in a pre-chamber and a second spark gap positioned on an external surface of the series gap igniter; and adjusting at least one of a plurality of cylinder settings based on the selected ignition mode. In the preceding example, additionally or optionally, the method further comprises: responsive to selecting the first ignition mode, operating in the first ignition mode, including determining a desired spark timing using a first spark timing calibration and actuating the series gap igniter at the desired spark timing; and responsive to selecting the second ignition mode, operating in the second ignition mode, including determining the desired spark timing using a second spark timing calibration, different than the first spark timing calibration, and actuating the series gap igniter at the desired spark timing. In one or both of the preceding examples, additionally or optionally, the plurality of cylinder settings include an intake valve open duration of an intake valve of the cylinder and an exhaust valve open duration of an exhaust valve of the cylinder, and adjusting at least one of the plurality of cylinder settings based on the selected ignition mode includes: operating the intake valve with the intake valve open duration adjusted to be longer in the first ignition mode than in the second ignition mode; and operating the exhaust valve with the exhaust valve open duration adjusted to be longer in the first ignition mode than in the second ignition mode. In any or all of the preceding examples, additionally or optionally, the plurality of cylinder settings include a fuel injection timing, and adjusting at least one of the plurality of cylinder settings based on the selected ignition mode includes: injecting fuel via a fuel injector at the fuel injection timing, the fuel injection timing adjusted to be advanced in the first ignition mode relative to the second ignition mode. In any or all of the preceding examples, additionally or optionally, selecting between operating the cylinder with the series gap igniter in the first ignition mode and the second ignition mode based on engine operating conditions includes selecting the first ignition mode responsive to an engine load exceeding a threshold engine load, and selecting the second ignition mode responsive to the engine load being less than the threshold engine load. In any or all of the preceding examples, additionally or optionally, selecting between operating the cylinder with the series gap igniter in the first ignition mode and the second ignition mode based on engine operating conditions includes selecting the first ignition mode responsive to the engine temperature being greater than a threshold engine temperature, and selecting the second ignition mode responsive to the engine temperature being less than the threshold engine temperature. In any or all of the preceding examples, additionally or optionally, the first ignition mode is calibrated for pre-chamber ignition and the second ignition mode is calibrated for spark ignition in the cylinder, and actuating the series gap igniter while operating in the first ignition mode and while operating in the second ignition mode produces spark at both the first spark gap and the second spark gap.

In another representation, a system comprises: an engine including a cylinder, a series gap igniter coupled to a cylinder head of the cylinder, the series gap igniter including a first spark gap in an internal volume of the series gap igniter and a second spark gap of the series gap igniter external to the internal volume of the series gap igniter and within a clearance volume of the cylinder. In the preceding example, additionally or optionally, the system further comprises: a controller storing executable instructions in non-transitory memory that, when executed, cause the controller to: select between operating in a first ignition mode and a second ignition mode based on engine operating conditions, the first ignition mode including providing ignition via the first spark gap of the series gap igniter, the second ignition mode including providing ignition via the second spark gap of the series gap igniter. In one or both of the preceding examples, additionally or optionally, the series gap igniter further includes an upper electrode and a lower electrode, the upper electrode including an upper electrode tip positioned within the internal volume at a distal end of the upper electrode, the lower electrode including a first lower electrode tip positioned within the internal volume and a second lower electrode tip positioned external to the series gap igniter, and wherein the first spark gap is positioned between the upper electrode tip and the first lower electrode tip. In any or all of the preceding examples, additionally or optionally, the series gap igniter further includes a ground electrode coupled to an outer wall of the series gap igniter, and wherein the second spark gap is positioned between the second lower electrode tip and the ground electrode. In any or all of the preceding examples, additionally or optionally, the first ignition mode is calibrated for pre-chamber ignition within the internal volume, and the second ignition mode is calibrated for spark ignition in the cylinder, external to the internal volume. In any or all of the preceding examples, additionally or optionally, operating in the first ignition mode includes further retarding a spark timing of the series gap igniter relative to operating in the second ignition mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

FIG. 2 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a series gap igniter coupled to a cylinder head of a cylinder, the series gap igniter including a first spark gap in an internal volume of the series gap igniter and a second spark gap external to the internal volume of the series gap igniter and within a clearance volume of the cylinder; and
a controller storing executable instructions in non-transitory memory that, when executed, cause the controller to:
initiate combustion in the cylinder via the first spark gap of the series gap igniter by actuating the series gap igniter using a first actuation timing calibration in response to both of an engine load being greater than a threshold engine load and an engine temperature being greater than a threshold engine temperature; and
initiate combustion in the cylinder via the second spark gap of the series gap igniter by actuating the series gap igniter using a second actuation timing calibration in response to at least one of the engine load not being greater than the threshold engine load and the engine temperature not being greater than the threshold engine temperature.

2. The system of claim 1, wherein the series gap igniter further includes a first electrode positioned entirely within the internal volume of the series gap igniter and a second electrode extending between the internal volume of the series gap igniter and the clearance volume of the cylinder.

3. The system of claim 2, wherein the first electrode includes a single electrode tip and the second electrode includes a first electrode tip positioned within the internal volume of the series gap igniter and a second electrode tip positioned within the clearance volume of the cylinder.

4. The system of claim 3, wherein the first spark gap is between the single electrode tip of the first electrode and the first electrode tip of the second electrode.

5. The system of claim 3, wherein the series gap igniter further includes a ground electrode tip coupled directly to a wall of the series gap igniter, the ground electrode tip positioned within the clearance volume of the cylinder, and wherein the second spark gap is between the second electrode tip of the second electrode and the ground electrode tip.

6. The system of claim 5, wherein the wall of the series gap igniter separates the internal volume of the series gap igniter from the clearance volume of the cylinder, and one or more orifices in the wall fluidically couple the internal volume of the series gap igniter to the clearance volume of the cylinder.

7. The system of claim 1, wherein the series gap igniter produces a first spark across the first spark gap and a second spark across the second spark gap when actuated.

8. A system, comprising:
an engine including a plurality of cylinders, each cylinder including a series gap igniter, the series gap igniter including a first spark gap internal to a pre-chamber and a second spark gap external to the pre-chamber, and a fuel injector; and
a controller storing executable instructions in non-transitory memory that, when executed, cause the controller to:
in response to both of a load of the engine being greater than a threshold load and a temperature of the engine being greater than a threshold temperature, operate the engine with cylinder settings calibrated for providing ignition via the first spark gap of the series gap igniter; and
in response to at least one of the load of the engine not being greater than the threshold load and the temperature of the engine not being greater than the threshold temperature, operate the engine with the cylinder settings calibrated for providing ignition via the second spark gap of the series gap igniter.

9. The system of claim 8, wherein the series gap igniter further includes an upper electrode and a lower electrode, the upper electrode including an upper electrode tip positioned within the pre-chamber, the lower electrode including a first lower electrode tip positioned within the pre-chamber and a second lower electrode tip positioned external to the pre-chamber.

10. The system of claim 9, wherein the first spark gap is positioned between the upper electrode tip and the first lower electrode tip.

11. The system of claim 9, wherein the series gap igniter further includes a ground electrode tip coupled to an outer wall of the series gap igniter, and wherein the second spark gap is positioned between the second lower electrode tip and the ground electrode tip.

12. The system of claim 11, wherein the upper electrode tip, the first lower electrode tip, and the second lower electrode tip are aligned along a central axis of the series gap igniter, and wherein the ground electrode tip is not aligned along the central axis of the series gap igniter.

13. A method for an engine, comprising:
providing a first spark via a first spark gap enclosed in a pre-chamber of a series gap igniter of a cylinder and a second spark via a second spark gap exterior to the pre-chamber by actuating the series gap igniter;
determining that a pre-chamber ignition mode is indicated at a first time in response to operating with an engine load exceeding a threshold engine load at the first time;
determining that a cylinder spark ignition mode is indicated at a second time in response to operating with the engine load not exceeding the threshold engine load at the second time; and
differently adjusting a timing of actuating the series gap igniter based on whether the pre-chamber ignition mode is indicated or the cylinder spark ignition mode is indicated.

14. The method of claim 13, wherein differently adjusting the timing of actuating the series gap igniter based on whether the pre-chamber ignition mode is indicated or the cylinder spark ignition mode is indicated comprises:
responsive to the pre-chamber ignition mode being indicated at the first time, operating the series gap igniter in the pre-chamber ignition mode by using a first actuation timing calibration at the first time; and
responsive to the cylinder spark ignition mode being indicated at the second time, operating the series gap igniter in the cylinder spark ignition mode by using a second actuation timing calibration at the second time.

15. The method of claim 14, wherein the first actuation timing calibration includes different actuation timings relative to maximum brake torque (MBT) timing than the second actuation timing calibration for producing a same torque ratio, and wherein determining that the pre-chamber ignition mode is indicated at the first time is further in response to operating with an engine temperature exceeding a threshold engine temperature at the first time.

16. The method of claim 14, further comprising:
inducting air into the cylinder via an intake valve and delivering fuel to the cylinder via a fuel injector to produce an air-fuel mixture in the cylinder; and
flowing a first portion of the air-fuel mixture into the pre-chamber via a pressure differential between the pre-chamber and the cylinder, a second portion of the air-fuel mixture remaining in the cylinder.

17. The method of claim 16, wherein operating the series gap igniter in the pre-chamber ignition mode by using the first actuation timing calibration at the first time includes:
igniting the first portion of the air-fuel mixture in the pre-chamber via the first spark to produce a pre-chamber combustion event; and
igniting the second portion of the air-fuel mixture via the pre-chamber combustion event.

18. The method of claim 16, wherein operating the series gap igniter in the cylinder spark ignition mode by using the second actuation timing calibration at the second time includes igniting the second portion of the air-fuel mixture in the cylinder via the second spark.

19. The method of claim 14, further comprising:
operating an intake valve of the cylinder with a greater intake valve open duration while operating the series gap igniter in the pre-chamber ignition mode at the first time than while operating the series gap igniter in the cylinder spark ignition mode at the second time; and
operating an exhaust valve of the cylinder with a greater exhaust valve open duration while operating the series gap igniter in the pre-chamber ignition mode at the first time than while operating the series gap igniter in the cylinder spark ignition mode at the second time.

20. The method of claim 14, further comprising:
delivering fuel to the cylinder at a fuel injection timing closer to top dead center of a compression stroke of the cylinder while operating the series gap igniter in the cylinder spark ignition mode at the second time than while operating the series gap igniter in the pre-chamber ignition mode at the first time.

21. A method, comprising:
selecting between operating a cylinder with a series gap igniter in a first ignition mode that is calibrated for pre-chamber ignition, and not calibrated for spark ignition in the cylinder, and a second ignition mode that is calibrated for the spark ignition in the cylinder, and not calibrated for the pre-chamber ignition, based on an engine load and an engine temperature, the series gap igniter including a first spark gap positioned in a pre-chamber and a second spark gap positioned external to the pre-chamber;
selecting the first ignition mode at a first time in response to operating with the engine load greater than a threshold engine load and the engine temperature greater than a threshold engine temperature at the first time;
selecting the second ignition mode at a second time in response to operating with the engine load greater than the threshold engine load and the engine temperature not greater than the threshold engine temperature at the second time; and
adjusting a plurality of a cylinder setting based on the selected ignition mode.

22. The method of claim 21, further comprising:
selecting the second ignition mode at a third time in response to operating with the engine load not greater than the threshold engine load and the engine temperature greater than the threshold engine temperature at the third time;
selecting the second ignition mode at a fourth time in response to operating with the engine load not greater than the threshold engine load and the engine temperature not greater than the threshold engine temperature at the fourth time;
responsive to selecting the first ignition mode at the first time, operating in the first ignition mode at the first time, including determining a desired spark timing using a first spark timing calibration and actuating the series gap igniter at the desired spark timing; and
responsive to selecting the second ignition mode at each of the second time, the third time, and the fourth time, operating in the second ignition mode at each of the second time, the third time, and the fourth time, including determining the desired spark timing using a second spark timing calibration, different than the first spark timing calibration, and actuating the series gap igniter at the desired spark timing.

23. The method of claim 21, wherein adjusting the cylinder setting based on the selected ignition mode includes:
   adjusting an intake valve open duration of an intake valve of the cylinder to be longer while operating the cylinder in the first ignition mode than while operating the cylinder in the second ignition mode; and
   adjusting an exhaust valve open duration of an exhaust valve of the cylinder to be longer while operating the cylinder in the first ignition mode than while operating the cylinder in the second ignition mode.

24. The method of claim 21, wherein adjusting the cylinder setting based on the selected ignition mode includes:
   adjusting a fuel injection timing of a fuel injector of the cylinder to be advanced while operating the cylinder in the first ignition mode relative to operating the cylinder in the second ignition mode.

25. The method of claim 21, wherein actuating the series gap igniter while operating in the first ignition mode and while operating in the second ignition mode produces spark at both the first spark gap and the second spark gap.

* * * * *